United States Patent
Clough

(10) Patent No.: US 6,666,517 B2
(45) Date of Patent: Dec. 23, 2003

(54) SEAT HEADREST

(76) Inventor: Robert Clough, 28846 Shadyview Way, Santa Clarita, CA (US) 91351

( * ) Notice: Subject to any disclaimer, the term of this patent is extended or adjusted under 35 U.S.C. 154(b) by 0 days.

(21) Appl. No.: 10/172,477

(22) Filed: Jun. 14, 2002

(65) Prior Publication Data
US 2002/0158499 A1 Oct. 31, 2002

Related U.S. Application Data

(63) Continuation-in-part of application No. 09/886,924, filed on Jun. 20, 2001, which is a continuation-in-part of application No. 09/665,992, filed on Sep. 20, 2000, now Pat. No. 6,250,716.

(51) Int. Cl.[7] ................................................. A47C 7/38
(52) U.S. Cl. .......................... 297/410; 297/391; 297/408
(58) Field of Search ................................. 297/391, 392, 297/408, 410

(56) References Cited

U.S. PATENT DOCUMENTS

| | | | | |
|---|---|---|---|---|
| 1,196,413 A | * | 8/1916 | Yohe | 297/410 |
| 3,885,831 A | * | 5/1975 | Rasmussen | 297/405 |
| 4,978,169 A | * | 12/1990 | Shannon et al. | 297/391 |
| 5,112,106 A | * | 5/1992 | Asbjornsen et al. | 297/284.7 |
| 5,205,585 A | * | 4/1993 | Reuber et al. | 297/410 |
| 5,232,265 A | * | 8/1993 | Estkowski et al. | 297/410 |
| 5,390,982 A | * | 2/1995 | Johnson et al. | 297/410 |
| 5,853,223 A | * | 12/1998 | Ritt et al. | 297/411.36 |
| 5,918,941 A | * | 7/1999 | Kigel | 297/353 |
| 6,305,749 B1 | * | 10/2001 | O'Connor et al. | 297/397 |

* cited by examiner

Primary Examiner—Peter R. Brown
(74) Attorney, Agent, or Firm—James E. Brunton

(57) ABSTRACT

An adjustable headrest that provides both support and comfort to the user and one that can be used in connection with furniture including household and office furniture and also in connection with various types of passenger vehicles. The headrest includes slide means for permitting easy height adjustment of the headrest and also includes locking means for securely locking the headrest in a desired elevated position. Further, the headrest includes easily adjustable, wing-like, side-support members that are pivotally connected to a centrally located, vertically adjustable head support member by means of constant torque hinges and also includes easily adjustable chin support members that are pivotally connected to the side support members by means of constant torque hinges.

13 Claims, 22 Drawing Sheets

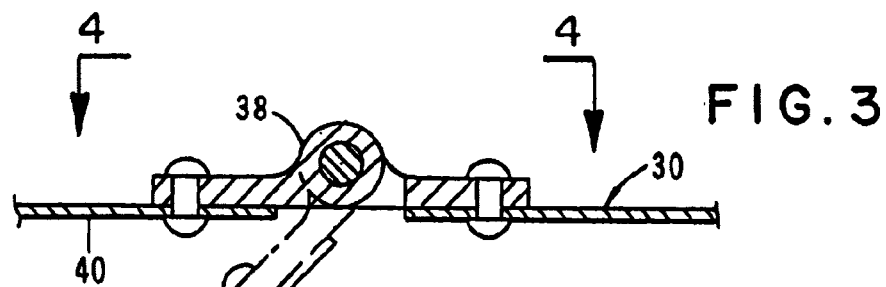
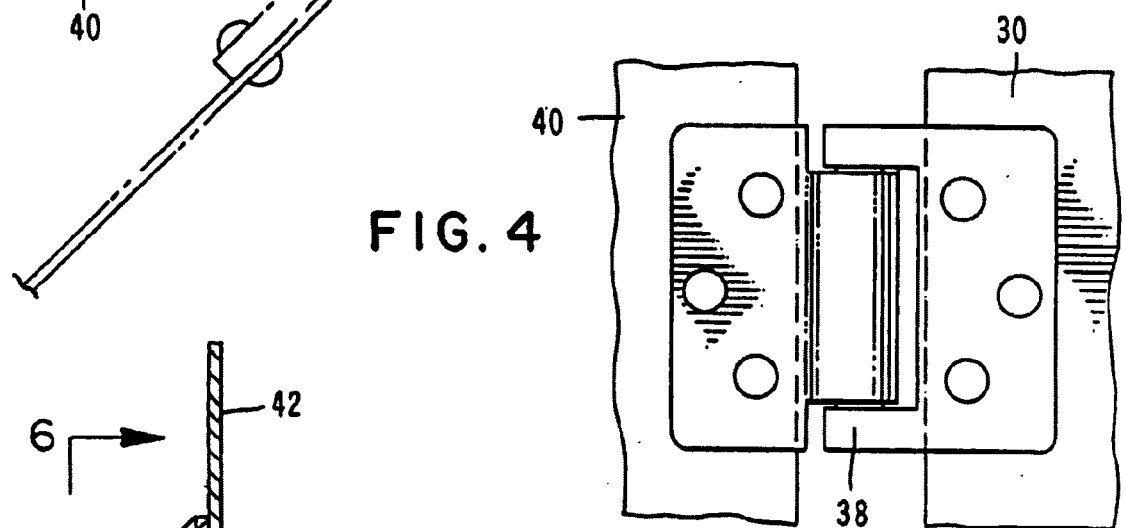
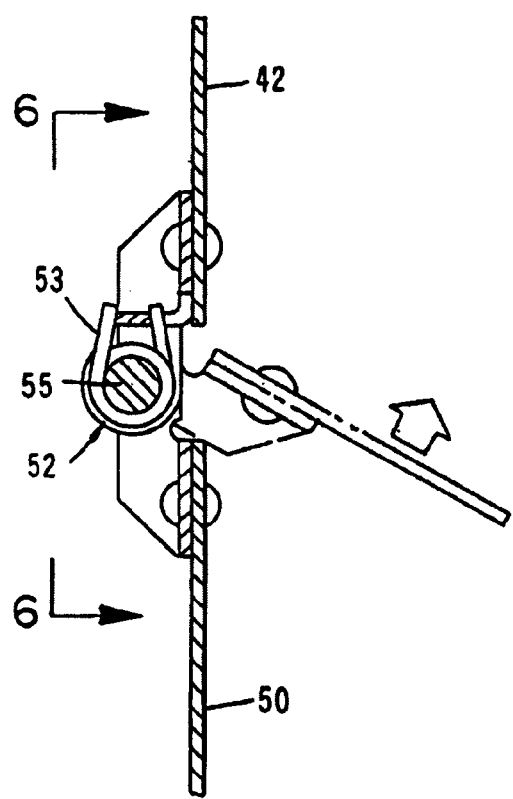
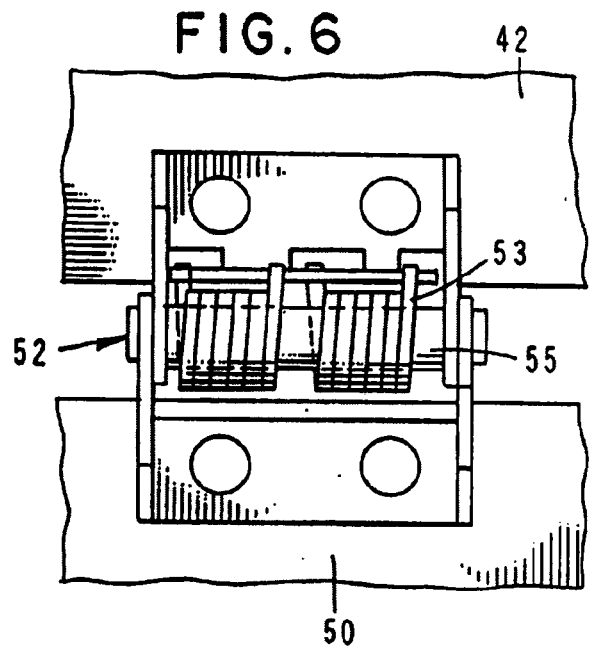

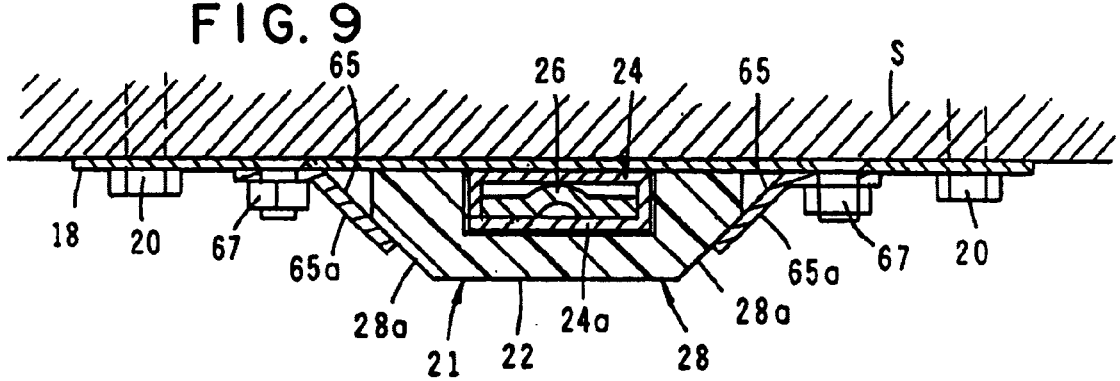
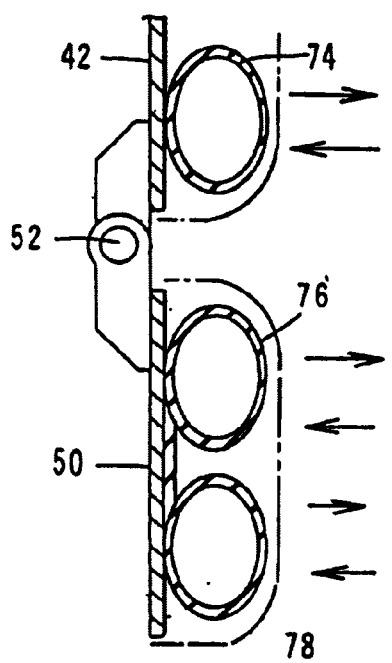
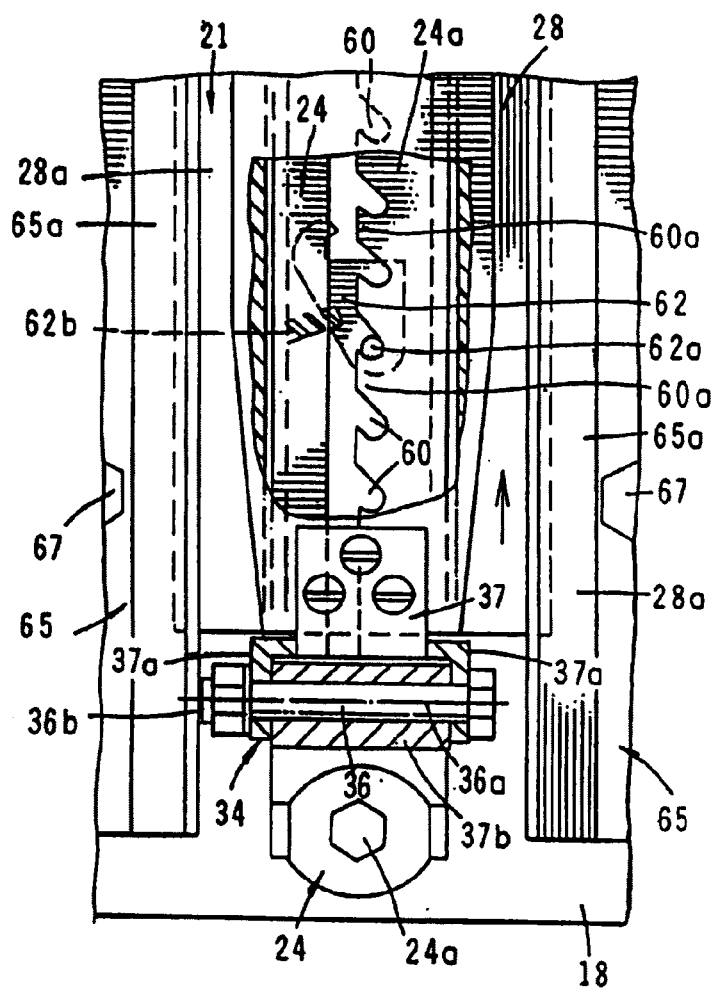

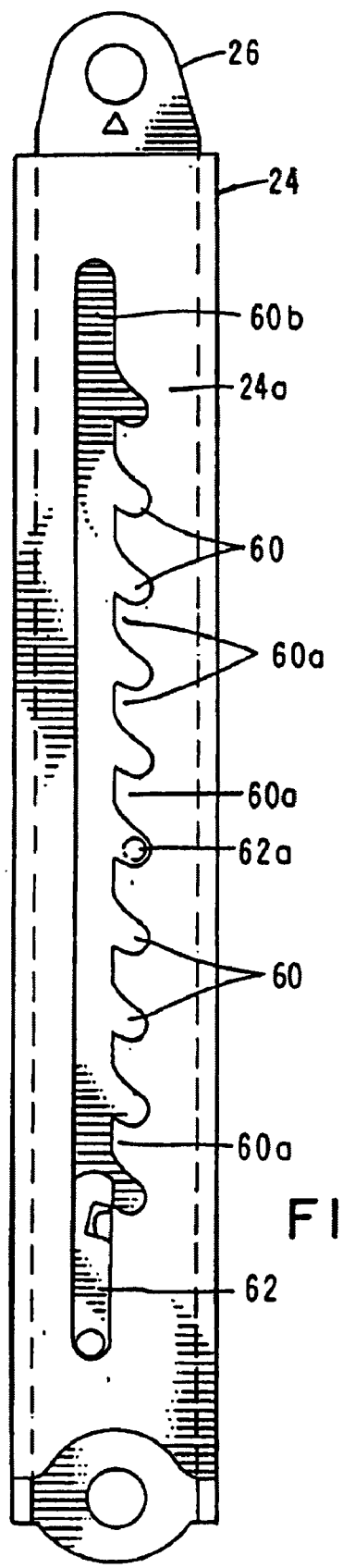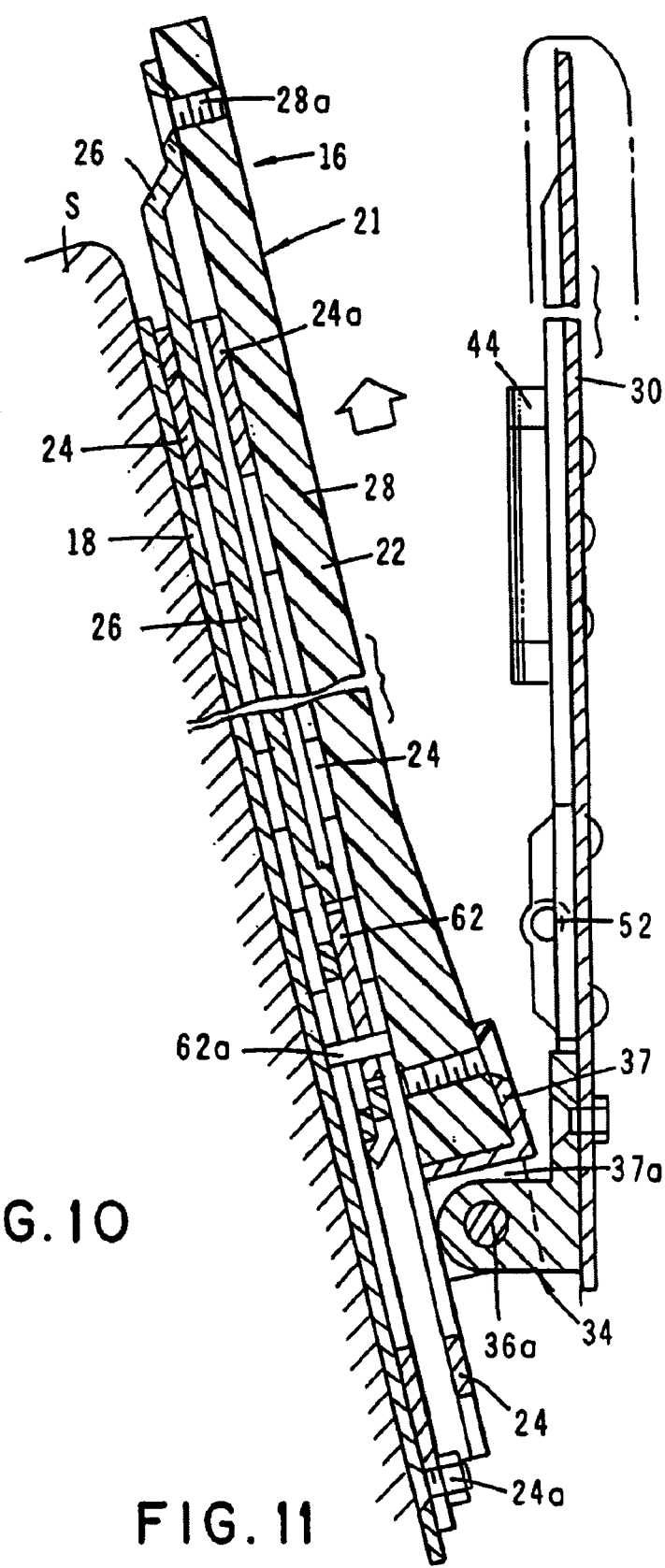
FIG.10
FIG.11

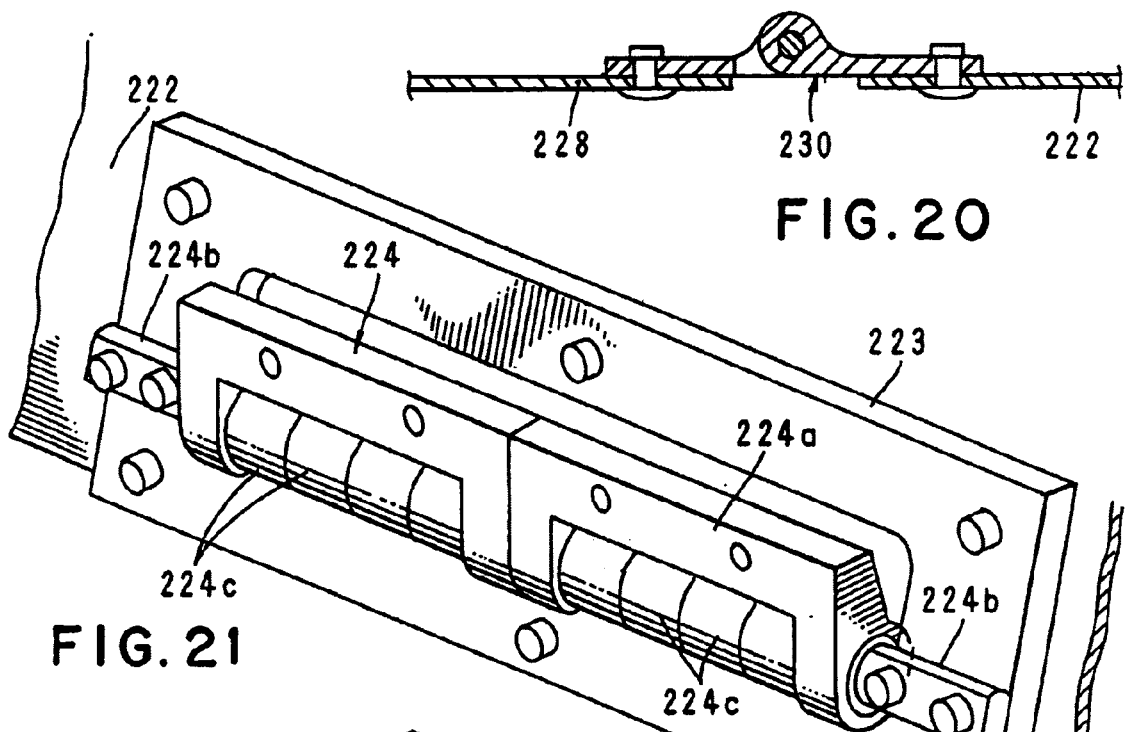
FIG.20
FIG.21
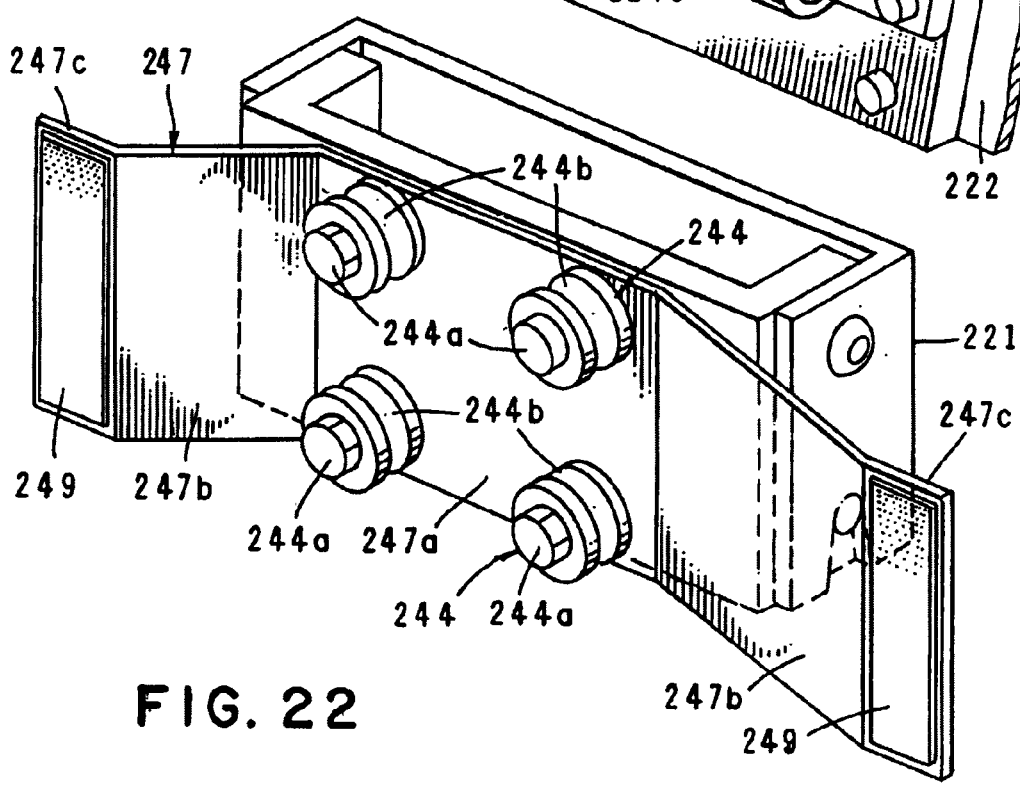
FIG.22

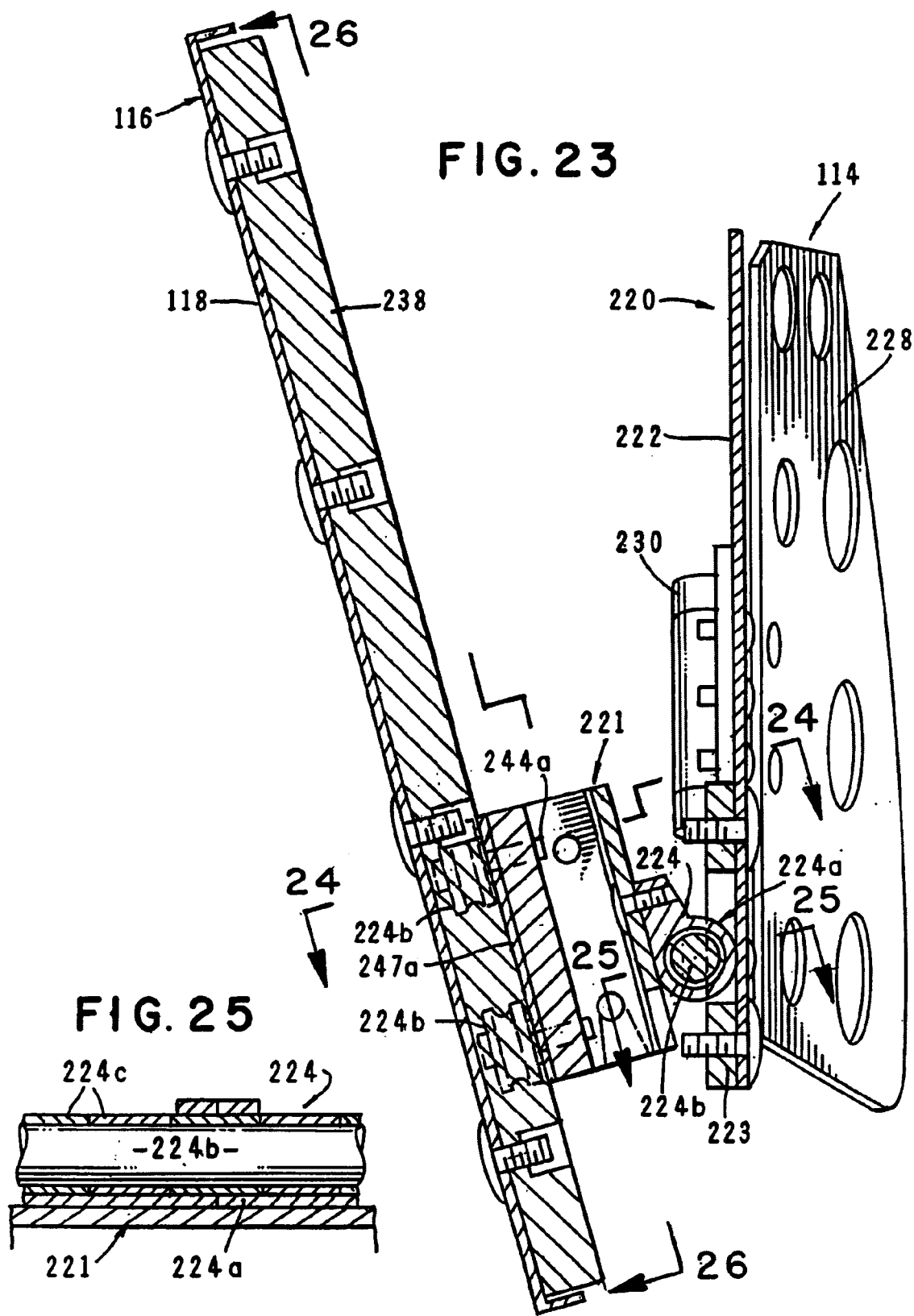

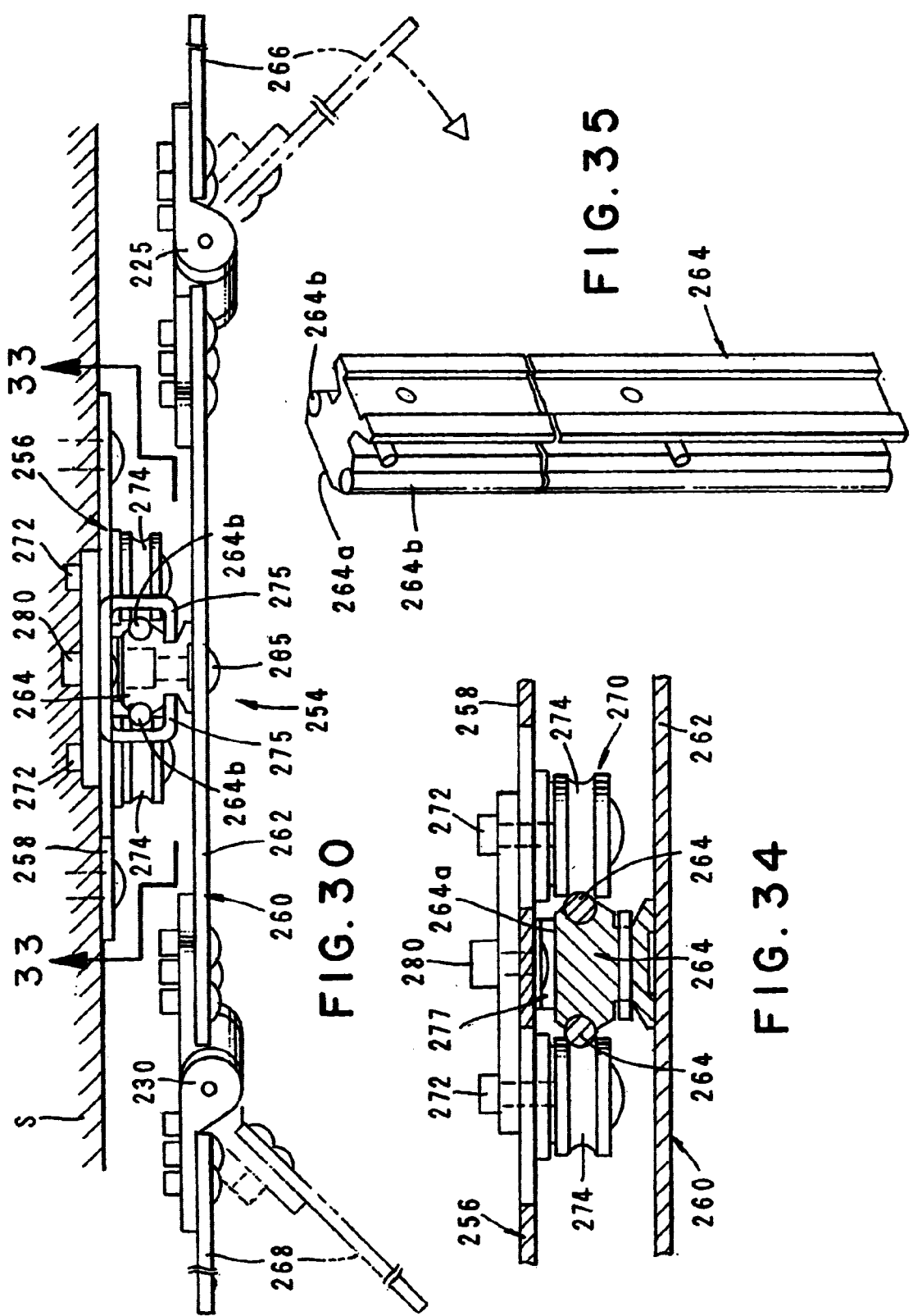

SEAT HEADREST

BACKGROUND OF THE INVENTION

This is a Continuation-In-Part application of application Ser. No. 09/886,924, filed Jun. 20, 2001, which is a Continuation-In-Part of application Ser. No. 09/665,992, filed Sep. 20, 2000, now U.S. Pat. No. 6,250,716.

FIELD OF THE INVENTION

The present invention relates generally to headrests for seats. More particularly, the invention concerns a fully adjustable headrest for use in connection with furniture and with passenger vehicles such as aircraft, trains and busses.

DISCUSSION OF THE PRIOR ART

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support member designed to provide protection against injury in the event of an accident. However, some vehicle headrests have also been provided with lateral headrest elements. Exemplary of such a headrest is that described in U.S. Pat. No. 5,997,091 issued to Rech et al.

In addition to passenger vehicle headrests, a number of headrests have been designed for use in a emergency vehicles. These types of headrests are of a more complicated design and some include greater adjustability features. Exemplary of these types of headrests are those disclosed in U.S. Pat. No. 5,275,462 and in U.S. Pat. No. 5,934,749 both issued to Pond et al.

Even more complex headrests have been designed for use in military aircraft and, more particularly in military aircraft for use in conjunction with ejection seats. Typical of this class of headrest design are those disclosed in U.S. Pat. No. 4,883,243 and U.S. Pat. No. 4,899,961 both issued to Herndon. Another such headrest design is disclosed in U.S. Pat. No. 4,466,662 to issued to McDonald et al.

In addition to the development of headrests for use in military aircraft, significant advances have been made in recent years in the design of headrests for use in commercial aircraft. Many of these headrests are designed for personal comfort and include pivotally movable back and lateral supports. In these latter types of headrests, the head support members are typically slidably mounted on spaced apart rods that extend upwardly from the back of the seat and rely on friction to maintain the headrest in an elevated position.

As will become clear from the discussion that follows, the headrests of the present invention represents a substantial improvement over the prior art headrests and provide significantly greater adjustability and therefore greater support and comfort to the user.

SUMMARY OF THE INVENTION

It is an object of the present invention to provide an adjustable headrest that provides both support and comfort to the user and can be used in connection with furniture including household and office furniture and also in connection with various types of passenger vehicles.

Another object of the invention is to provide a headrest of the aforementioned character that includes slide means for permitting easy height adjustment of the headrest and also includes locking means for securely locking the headrest in a desired elevated position.

Another object of the invention is to provide easily adjustable, wing like, side support members that are pivotally connected to a centrally located, vertically adjustable head support member by means of constant torque hinges.

Another object of the invention to provide easily adjustable chin support members that are pivotally connected to the side support members by means of constant torque hinges.

Another object of the invention is to provide an adjustable headrest construction of the character described that includes strategically positioned comfort cushions for engagement by the user's neck, head and chin.

Another object of the invention is to provide an adjustable headrest construction of the type described in the preceding paragraphs in which the cushions are readily inflatable and deflatable.

Another object of the invention is to provide a headrest construction of the class described that is of a simple construction and one that can be inexpensively produced and easily installed.

BRIEF DESCRIPTION OF THE DRAWINGS

FIG. 3 is an enlarged, cross-sectional view taken along lines 3—3 of FIG. 1.

FIG. 4 is a view taken along lines 4—4 of FIG. 3.

FIG. 5 is an enlarged, cross-sectional view taken along lines 5—5 of FIG. 1.

FIG. 6 is a view taken along lines 6—6 of FIG. 5.

FIG. 8A is a view similar to FIG. 8, but showing the support assembly raised and the pawl type locking mechanism thereof in a locked position preventing downward movement of the support assembly.

FIG. 9 is a cross-sectional view taken along lines 9—9 of FIG. 8.

FIG. 10 is a front view of one form of the slide mechanism of the invention.

FIG. 11 is a cross-sectional view similar to FIG. 7, but showing the head support assembly in an intermediate upraised position.

FIG. 13 is an enlarged, cross-sectional view taken along lines 13—13 of FIG. 12.

FIG. 20 is a cross-sectional view taken along lines 20—20 of FIG. 17.

FIG. 21 is a greatly enlarged, generally prospective view of one of the hinge assemblies that connects the front and back portions of the headrest.

FIG. 22 is a generally prospective view of one form of the carriage assembly of the invention that interconnects the front portion of the headrest with the rear portion thereof.

FIG. 23 is an enlarged, cross-sectional view taken along lines 23—23 of FIG. 17.

FIG. 24 is a greatly enlarged, cross-sectional view taken along lines 24—24 of FIG. 23.

FIG. 25 is a cross-sectional view taken along lines 25—25 of FIG. 23.

FIG. 30 is a cross-sectional view taken along lines 30—30 of FIG. 27.

FIG. 34 is an enlarged, cross-sectional view taken along lines 34—34 of FIG. 33.

FIG. 35 is a generally perspective, fragmentary view of the roller guide component of this latest form of the invention.

DESCRIPTION OF THE INVENTION

Figure 1:
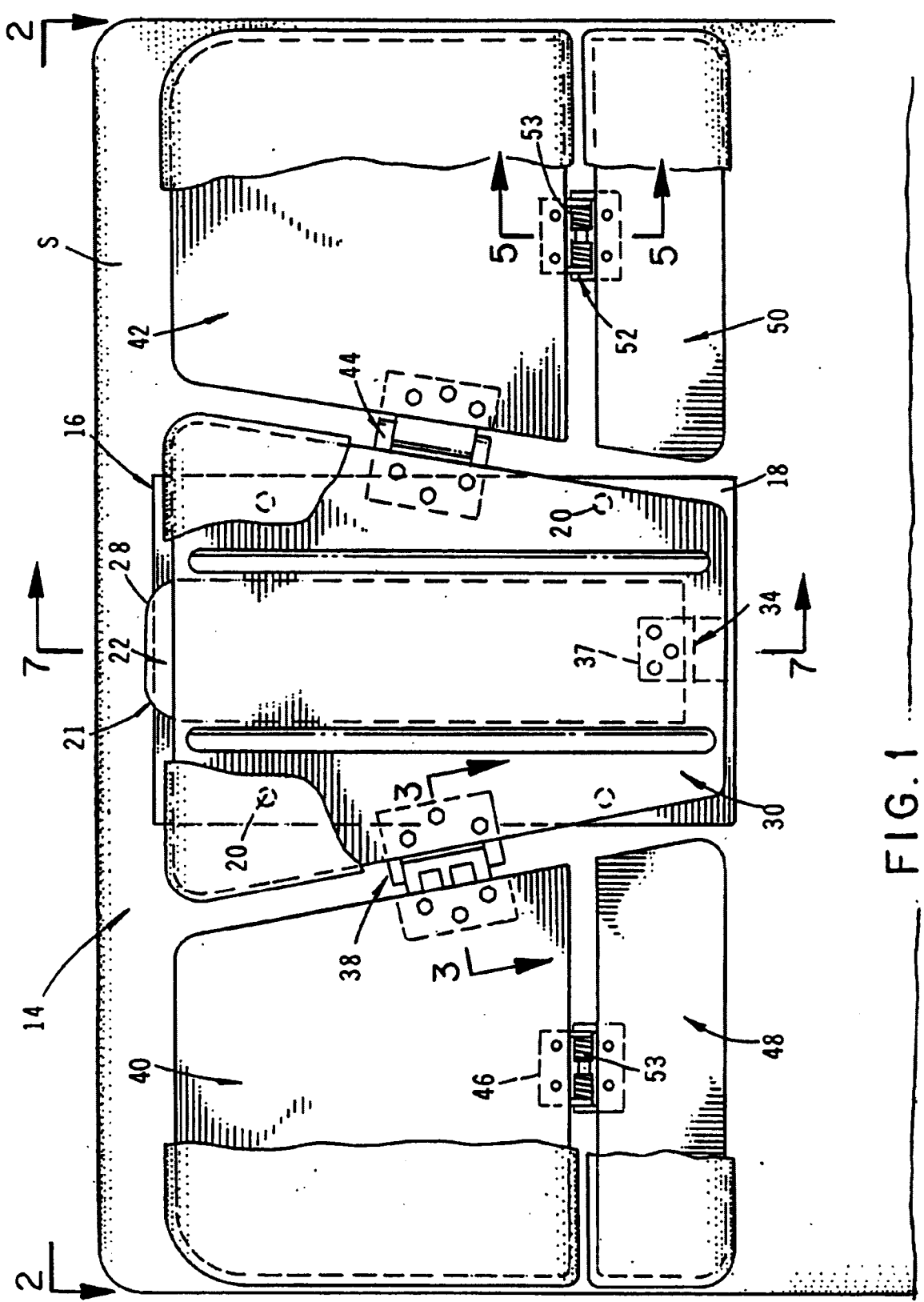
FIG. 1 is a front view of one form of the seat headrest apparatus of the invention partly broken away to show internal construction.
Figure 2:
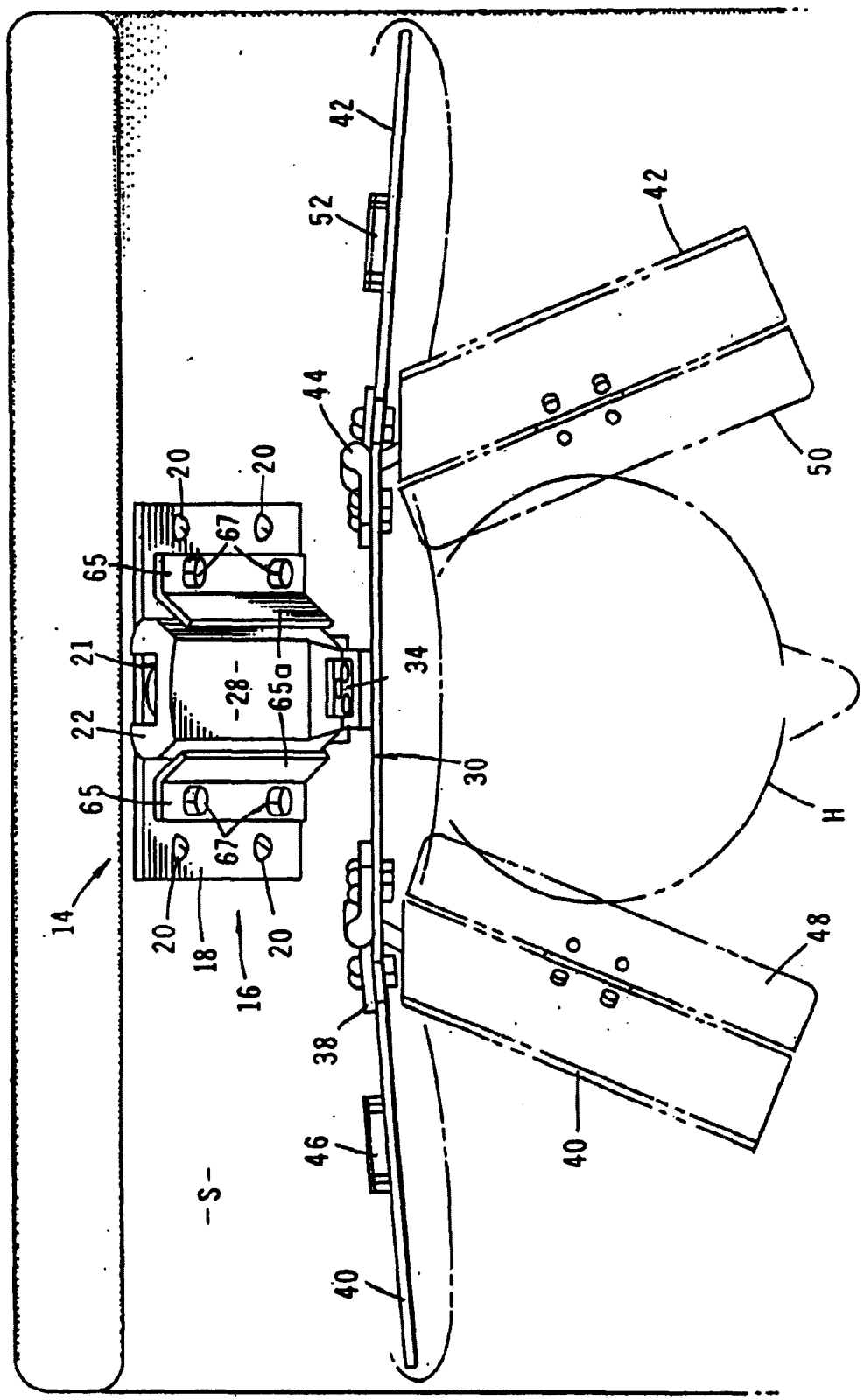
FIG. 2 is a view taken along lines 2—2 of FIG. 1.
Figure 11A:
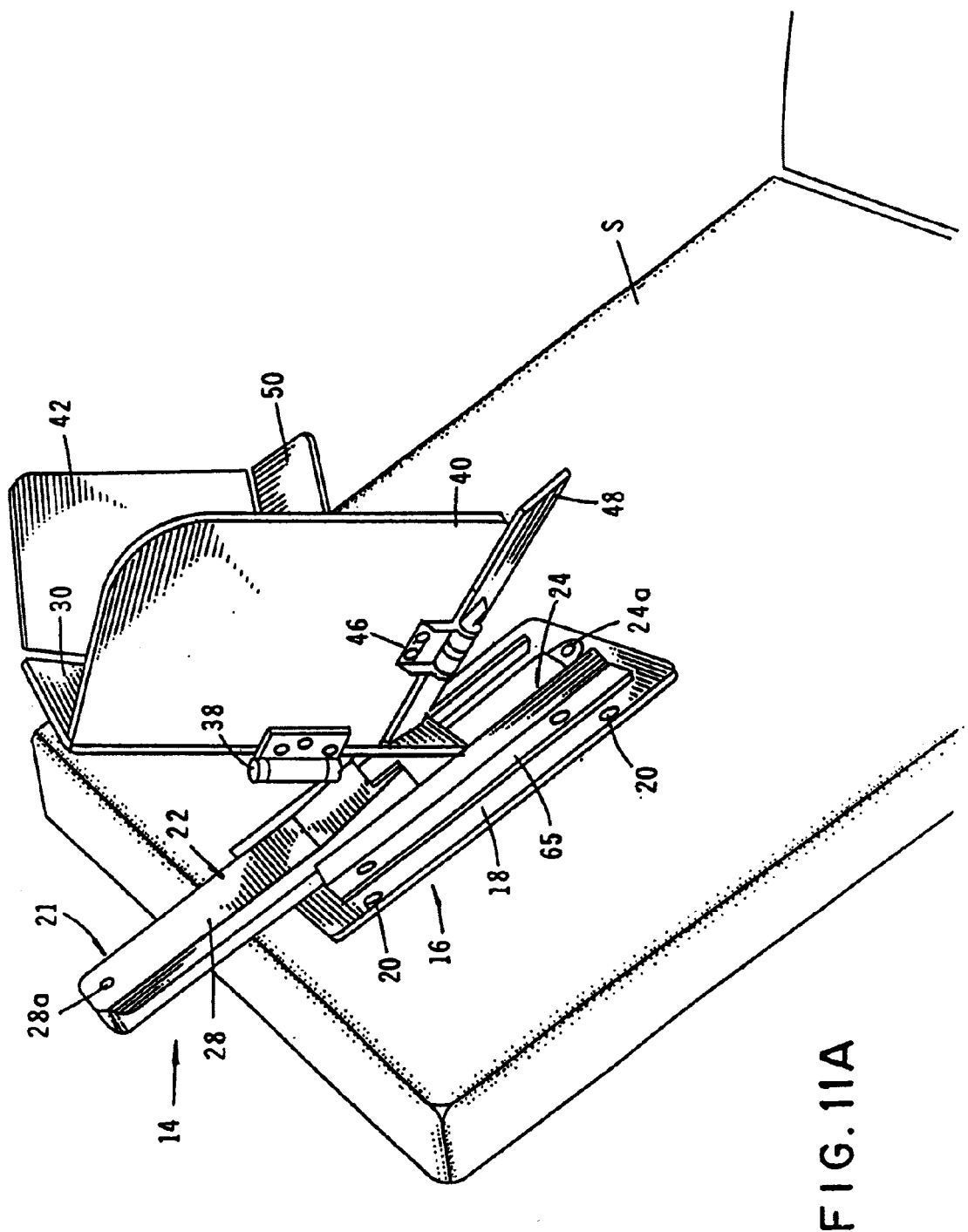
FIG. 11A is a generally perspective view of the apparatus of the invention shown affixed to the seat and illustration the articulation of the various support components of the headrest assembly of the apparatus.

Referring to the drawings and particularly to FIGS. 1, 2, and 11A, one form of the seat headrest of the invention is there illustrated and generally designated by the numeral 14. The seat headrest here comprises a seat connector assembly 16 that includes a connector member 18 that is connected to the seat "S" by any suitable means such as threaded connectors 20 (FIGS. 2 and 8). A support assembly 21 is slidably connected to connector member 18 for movement between a first position shown in FIG. 7 to an intermediate position shown in FIG. 11 and to an upraised position shown in FIG. 11A.

Figure 7:
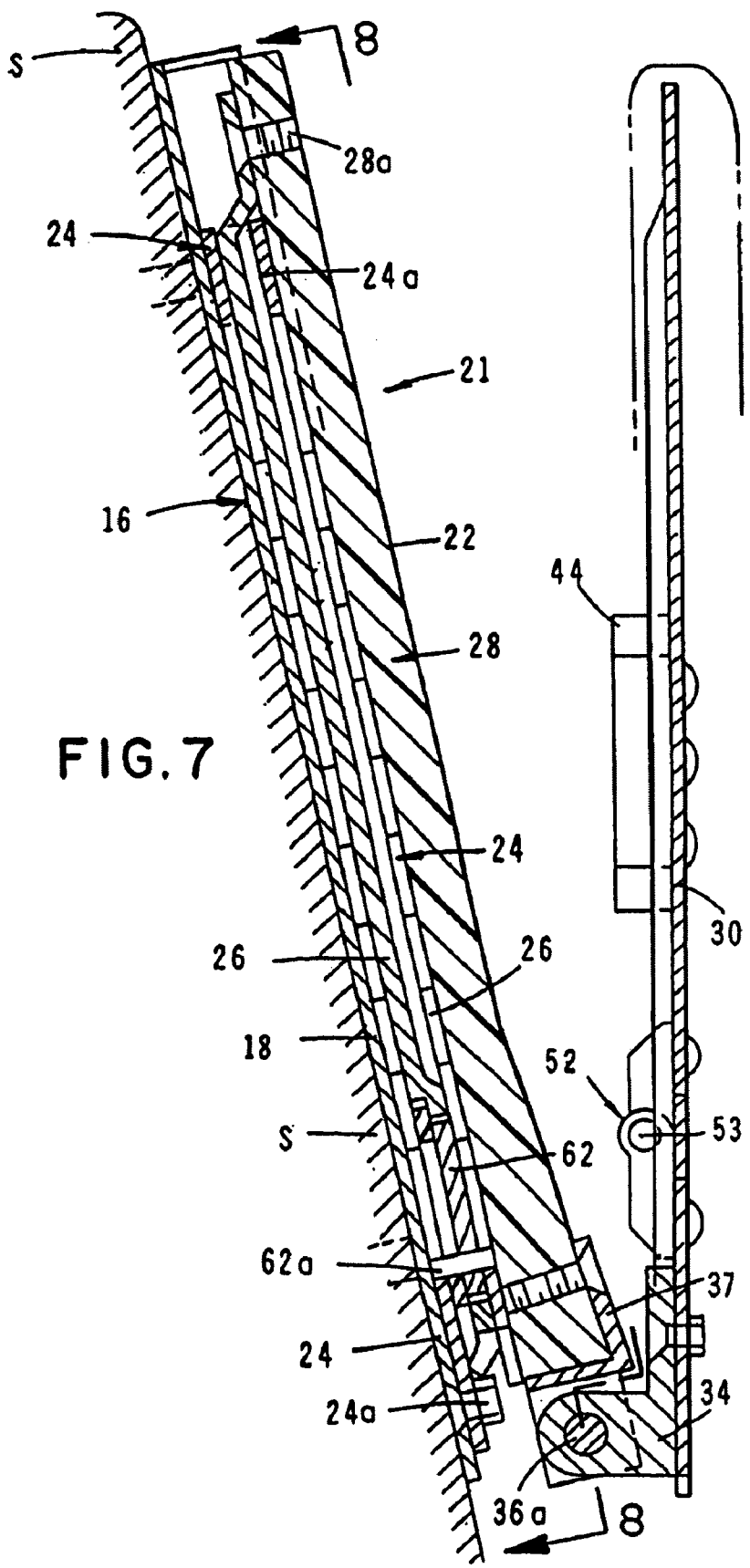
FIG. 7 is an enlarged, cross-sectional view taken along lines 7—7 of FIG. 1.
Figure 8:
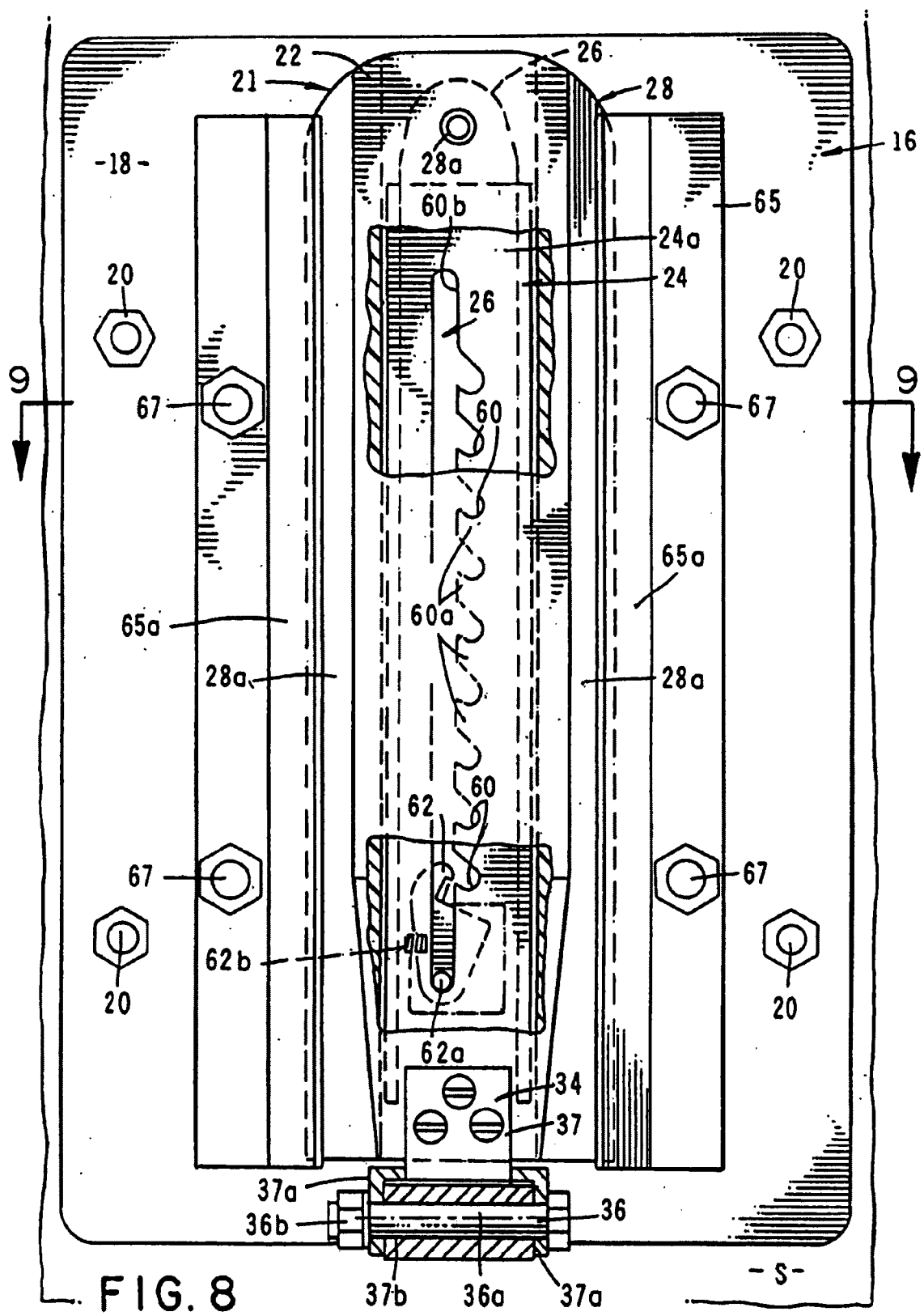
FIG. 8 is a view taken along lines 8—8 of FIG. 7.

Support assembly 21 here comprises a slide mechanism 22, including a track 24, that is connected to connector member 18 by a suitable connector such as connector 24a (FIGS. 7 and 10). Slide mechanism 22 also includes a slide assembly 26 that slides within track 24 in a manner presently to be described. Connected to slide assembly 26 by a threaded connector 28a is a mounting member 28 (FIG. 7). A first head support member 30 is pivotally connected to member 28 by means of a friction hinge pivot assembly 34 that includes a transversely extending pivot pin 36 and a connector bracket 37 (FIGS. 7 and 8). With this construction, first support member 30 can be pivoted about the axis of the shaft 36a of a connector bolt 36 from a first position adjacent mounting member 28 to an angularly outwardly extending position as shown in FIGS. 7 and 11A. As best seen in FIG. 8, bracket 37 includes spaced apart apertured legs 37a that receive the shaft of bolt 36. Disposed between legs 37a is a bearing 37b having a transverse bore that receives shaft 36a of bolt 36. With this construction, when nut 36b is snugged down against one of the legs, pivoting of support member 30 will be controllably frictionally resisted.

Pivotally connected to first head support member 30 by a constant torque hinge 38 is a first lateral, or side wing 40 that is pivotally movable from the position shown in FIGS. 1 and 2 wherein it is substantially coplanar with head support member 30 to a second angularly extending forward position shown by the phantom lines in FIG. 2. In similar fashion, a second, or lateral side wing 42 is connected to the opposite side of support member 30 by a constant torque hinge 44 that is of identical construction to constant torque hinge 38. Side wing 42 is also pivotally movable from the substantially coplanar position shown in FIG. 2 to the angularly outwardly extending position shown by the phantom lines in FIG. 2. When side wings 40 and 42 are pivoted into the position shown by the phantom lines in FIG. 2, they can provide a comfortable lateral support to the passenger's head "H" in the manner shown in FIG. 2.

Hingedly connected to side wing 40, by means of a constant torque, friction imparting hinge 46 is a first chin support 48. Similarly, a second chin support 50 is hingedly interconnected with side wing 42 by means of a constant torque hinge 52 that is of identical construction to hinge 46 (FIG. 1). Constant torque hinges 38, 44, 46 and 52, which are readily commercially available from sources such as Reel Precision Manufacturing of St. Paul, Minn. function to maintain the side wings and chin supports in a selected position until a substantial force is exerted on the hingedly connected member to positively move it into a different position. More particularly, as best seen in FIG. 6, each of the constant torque hinges includes a torsion spring 53 that circumscribes pivot pin or rod 55 and engages the leaves of the hinge in a manner such that relative pivotal movement of the leaves of the hinges produce a constant torque tending to continuously resist the relative pivotal movement of the leaves. In this way, movement of one of the hingedly support members relative to the other is continuously, positively resisted. The use of the constant torque spring hinges in this manner uniquely overcomes a common drawback of prior art head rest construction in which the hingedly connected members tend to undesirably move as a result of vibration and other environmental forces. It is to be understood that a friction-imparting, constant-torque hinge could also be used to hingedly connect first head support member 30 to member 28.

Referring particularly to FIGS. 7, 8, 9, 10, and 11, the novel slide means of the invention for slidably interconnecting the support assembly 21 with seat connector member 18 is there illustrated. In the present form of the invention, this slide means comprises the previously identified slide mechanism 22 which is of conventional construction and is readily commercially available from sources such as Dirak Gmbh & Co. of Ennepetal, Germany. As previously mentioned slide assembly 26 is controllably movable within track 24 from the position shown in FIG. 7 wherein slide member is substantially enclosed within the hollow housing portion of track 24 to a second extended position wherein the slide assembly extends outwardly from the track housing 24 a substantial distance.

As best seen by referring to FIGS. 9, 10 and 11, the hollow housing of track 24 includes having an upper surface 24a that is provided with a plurality of spaced-apart, angularly, downwardly extending notches 60 that are configured to receive the locking pin 62a of a pawl 62 that is carried by track 24 for pivotal movement between a first retracted position shown in FIGS. 8 and 10 to a second position shown in FIG. 8A wherein pin 62a is urged into a selected notch by means of a biasing spring 62b. With this construction, as slide 26 moves upwardly within track 24, locking pin 62a will ride over the tooth-like portions 60a located intermediate to notches 60. However, due to the urging of spring 62b, pin 62a will drop into a selected notch when upward movement of the slide assembly ceases. When locking pin 62a has thusly been urged into a selected notch, downward movement of slide assembly will be positively prevented. However, when the slide assembly reaches its uppermost position, pawl 62 will enter slot 60b (FIG. 10) where it will once again move into a retracted position permitting the support assembly to move downwardly toward its starting position. As indicated in FIG. 9, mounting member 28, which is interconnected with slide assembly 26 and moves therewith, is guided by guide means shown here as a pair of spaced-apart guide brackets 65 that are connected to connector member 18 by threaded connectors 67. Each of the brackets 65 includes an angularly outwardly extending segment 65a that guidingly engage the sloping side walls 28a of mounting member 28.

Figure 12:
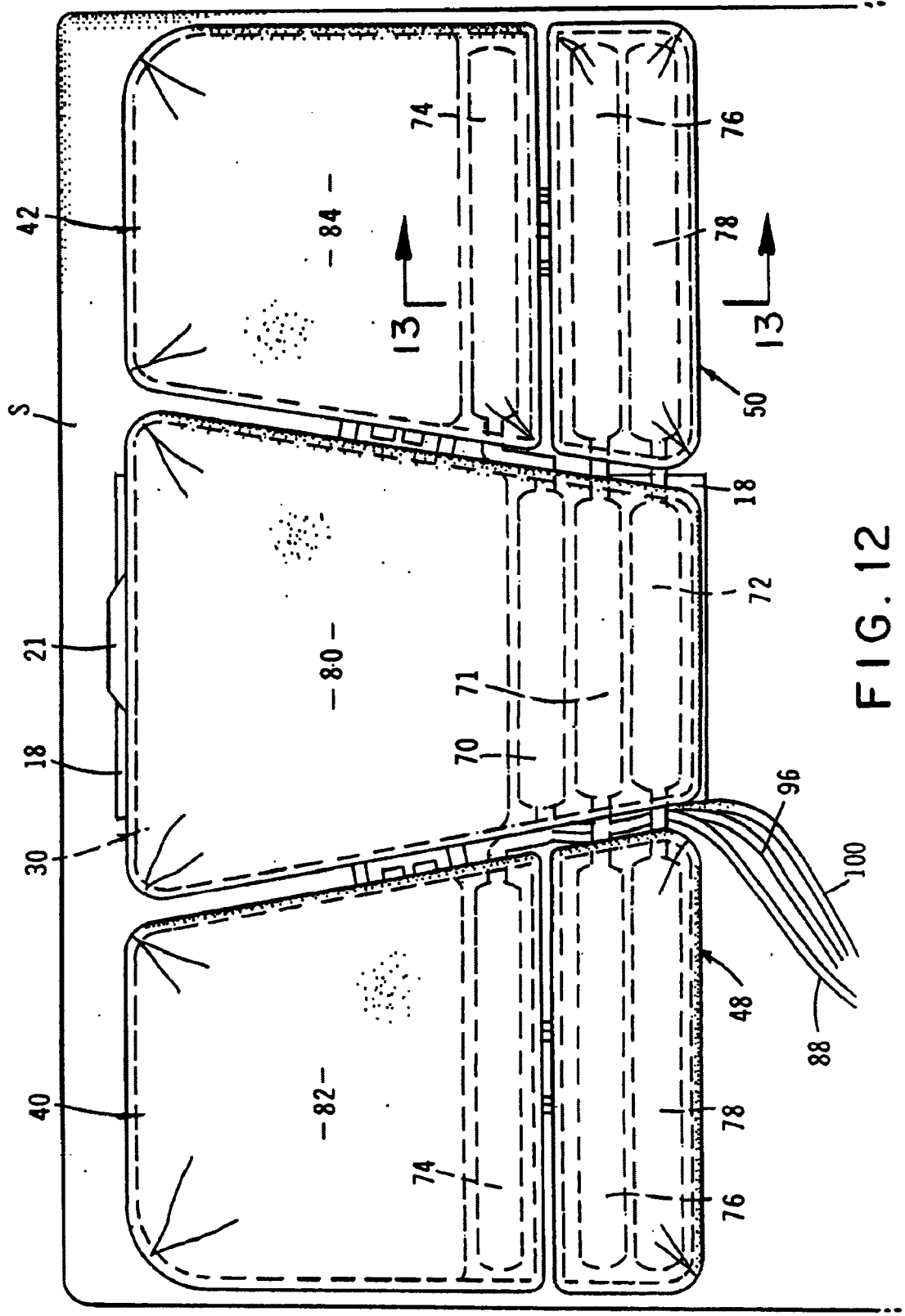
FIG. 12 is a front view of an alternate form of the headrest apparatus of the invention having inflatable cushions or air bags affixed to the various support members of the apparatus.
Figure 15:
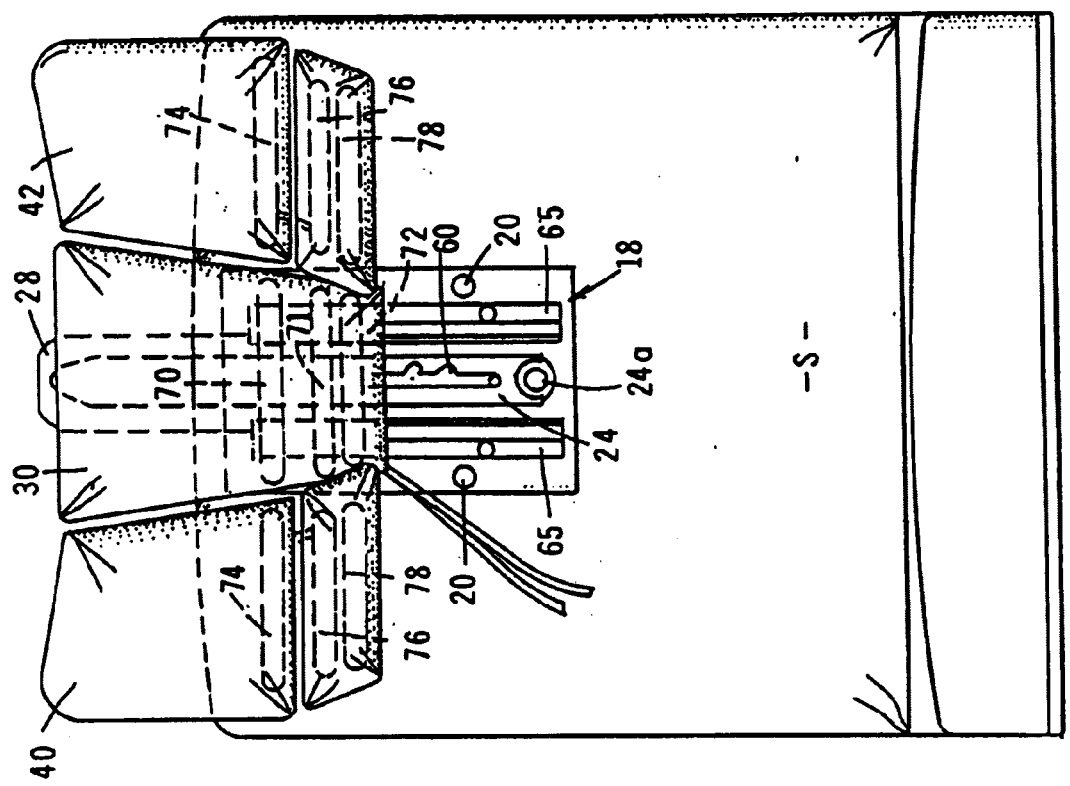
FIG. 15 is a view similar to FIG. 14 but showing the support assembly in a raised position.
Figure 14:
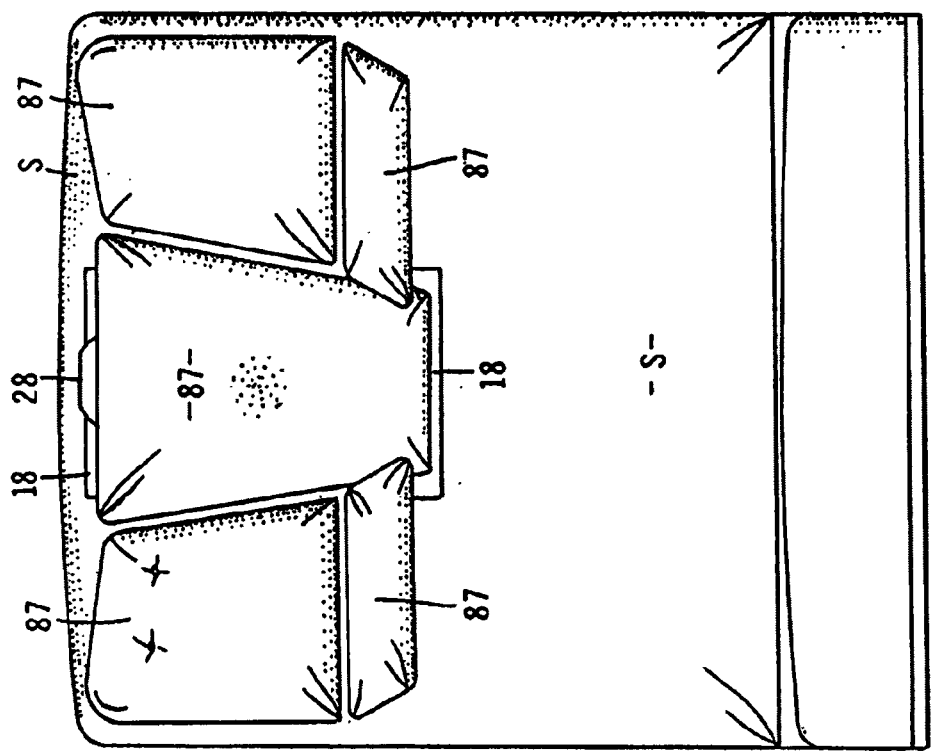
FIG. 14 is a front view of the apparatus shown in FIG. 12 as it appears when affixed to a seat.

Turning next to FIGS. 12 through 16, an alternate form of the headrest apparatus of the present invention is there illustrated. This form of the invention is similar in many respects to that illustrated in FIGS. 1 through 11 and previously described herein. Because of the similarity of these embodiments, like numbers are used in FIGS. 12 through 16 to identify like components. The principal difference between this latest embodiment of the invention and that earlier described resides in the fact that inflatable cushions or air bags are attached to the various support components that make up the headrest assembly. More particularly, as shown in FIG. 12, three inflatable air bags or bladders 70, 71, and 72 are interconnected with the lower portion of support member 30, while a single air bag 74 is affixed to each of the side panels 40 and 42. In similar fashion, first and second air bags or bladders 76 and 78 are attached to each of the chin support members 48 and 50. Air bags 70, 71, and 72 are disposed below a main cushion 80 that is affixed to the upper portion of support member 30. Similarly, air bag 74 is positioned below a larger support cushion 82 that is affixed to side wing 40 while inflatable air bag 74 is disposed beneath a larger cushion 84 that is affixed to side wing 42. Cushions 82 and 84 can be of a conventional padded cushion construction, or, if desirable, could also be inflatable bladder components. When installed to the support component in the manner illustrated in FIG. 12, the supporting cushions and inflatable air bags are covered by a conventional upholstery cover 87 so that the assembly takes on the finished configuration shown in FIG. 14. Covering 87 can be of fabric or vinyl material and is suitably flexible to enable the inflation and deflation of the bladder component without unduly stressing the cover material. FIG. 15 illustrates the support assemblage shown in FIG. 14 in the upraised position wherein the support assembly has been moved to the uppermost position by sliding it along the sliding mechanism which is of the character previously described.

Figure 16:
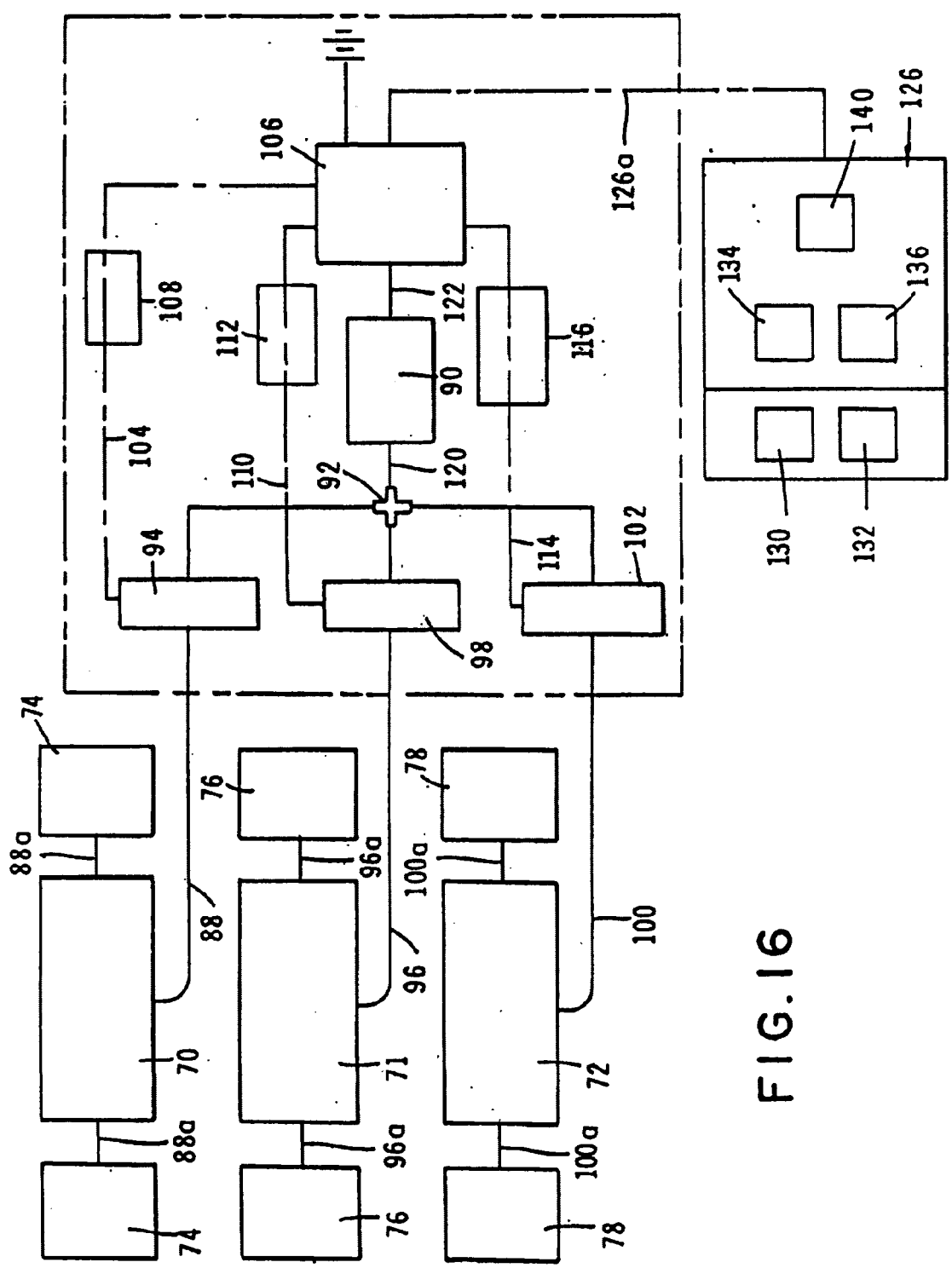
FIG. 16 is a generally schematic, block diagram view showing the various components that make up the control means of the apparatus for inflating and deflating the air bags.

Referring to FIG. 16, one form of the control system, or control means of the invention for operating the air bags, or inflatable cushions, is there illustrated in schematic form. Shown in the left-hand portion of FIG. 16 are the inflatable bladders that have been previously identified and that are connected to the left, center and right support members. As indicated in FIG. 16, central bladder 70 is interconnected by means of a pneumatic hose 88 with an air pump 90 via a pneumatic junction 92 and a first solenoid valve 94. Bladders 74 are, in turn, connected to bladder 70 by pneumatic hoses 88a. Similarly, inflatable bladder 71 is interconnected by means of a pneumatic hose 96 with pump 90 via pneumatic junction 92 and a second solenoid valve 98. Bladders 76 are, in turn, connected to bladder 71 by pneumatic hoses 96a. In similar manner, inflatable bladder 72 is interconnected by means of a pneumatic hose 100 with air pump 70 via pneumatic junction 92 and a third solenoid valve 102. Bladders 78 are, in turn, connected to bladder 72 by pneumatic hoses 100a. First solenoid valve 94 is interconnected by means of an electric connnector 104 with the central processing unit 106 of the apparatus via a first relay 108. Similarly, second solenoid 98 is interconnected by means of an electrical conduit 110 with central processing unit 106 via a second relay 112. In similar manner third solenoid valve 102 is interconnected by means of an electrical conduit 114 with central processing unit 106 via a third relay 116. Air pump 90 is interconnected with pneumatic junction 92 by means of an air hose 120. Motor pump 90 is also operably interconnected with central processing unit 106 by an electrical connector 122. Central processing unit 106 is of a conventional construction that is readily commercially available and is powered by a conventional external power source. Similarly pump 90, pneumatic junction 92, as well as the solenoids and relays that make up the control system are well understood by those skilled in the art and are also readily commercially available.

Central processing unit 106 is operably interconnected by an electrical connector 126a with an occupant control means, shown here as a control panel 126. In the form of the invention shown in FIG. 16, occupant control panel 126 includes an inflate switch 130 for use in inflating the bladders and a deflate switch 132 for use in deflating the bladders. Also provided on occupant panel 126 is an on/off massage switch 140 that can be manipulated to cause a massaging type action to be imparted to the passenger by the sequential inflation and deflation of the air bags or bladders that are affixed to the various support members. Switch 140 is operably coupled with switches 134 and 136 to enable faster and slower massage cycle rates. With the construction shown in FIG. 16, the inflatable air bags, or bladders, can be inflated or deflated independently either in series or in parallel for the purpose of controlling bladder firmness or for performing an upper back, neck, face and head message cycle for a preprogrammed time in accordance with a program contained within central processing unit 106. Once again, switches 130, 132, 134, and 136 are of a conventional design well understood by those skilled in the art.

Motor pump 90 can be powered by an existing seat power supply as, for example, a seat controller lumbar controller, seat motor controller or the like, or it may be powered by a power supply interconnected with and dedicated to motor pump 90. It is to be understood that the electrical and pneumatic interconnection shown schematically in FIG. 16 is well understood by those skilled in the art as is the necessary programming of central processing unit 106 to accomplish the desired inflation and deflation sequencing of the various air bags or bladders.

For certain end use application, central support member 30 can be provided with a greater or lesser number of inflatable air bags. Similarly, side panels 40 and 42 may have more than one air bag and chin support member 48 can be provided with one, two or more inflatable bladders as may be desired by the system designer. Similarly the occupant control panel can be designed to accommodate more or less inflatable bladders and may also be designed to cooperate with the central processing unit to accomplish various other inflation/deflation and message type cycles as may be desired for the particular vehicle in which the apparatus is installed.

Figure 17:
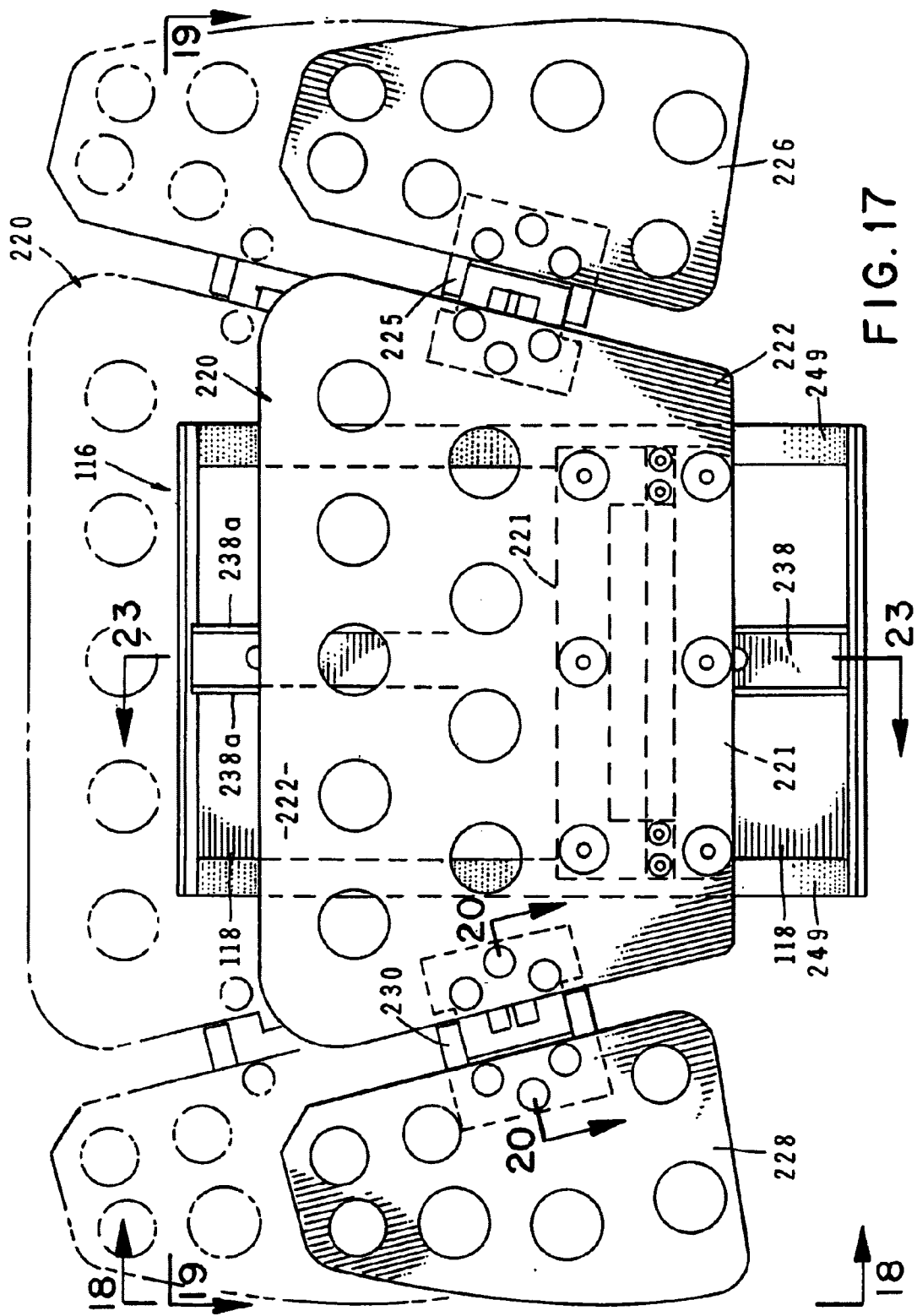
FIG. 17 is a front view of an alternate form of seat headrest construction of the present invention.

Referring next to FIGS. 17 through 26, an alternate form of seat headrest of the invention is there illustrated and generally designated by the numeral 114. This latest embodiment of the invention comprises a seat connector assembly 116 that includes a generally planar first connector member 118 that is connected to the seat "S" by any suitable means. Slidably connected to first connector member 118 for movement between a first lowered position shown by the solid lines in FIG. 17 to an upraised position shown by the phantom lines in FIG. 17 is a head support assembly 220 (see also FIG. 26).

Figure 19:
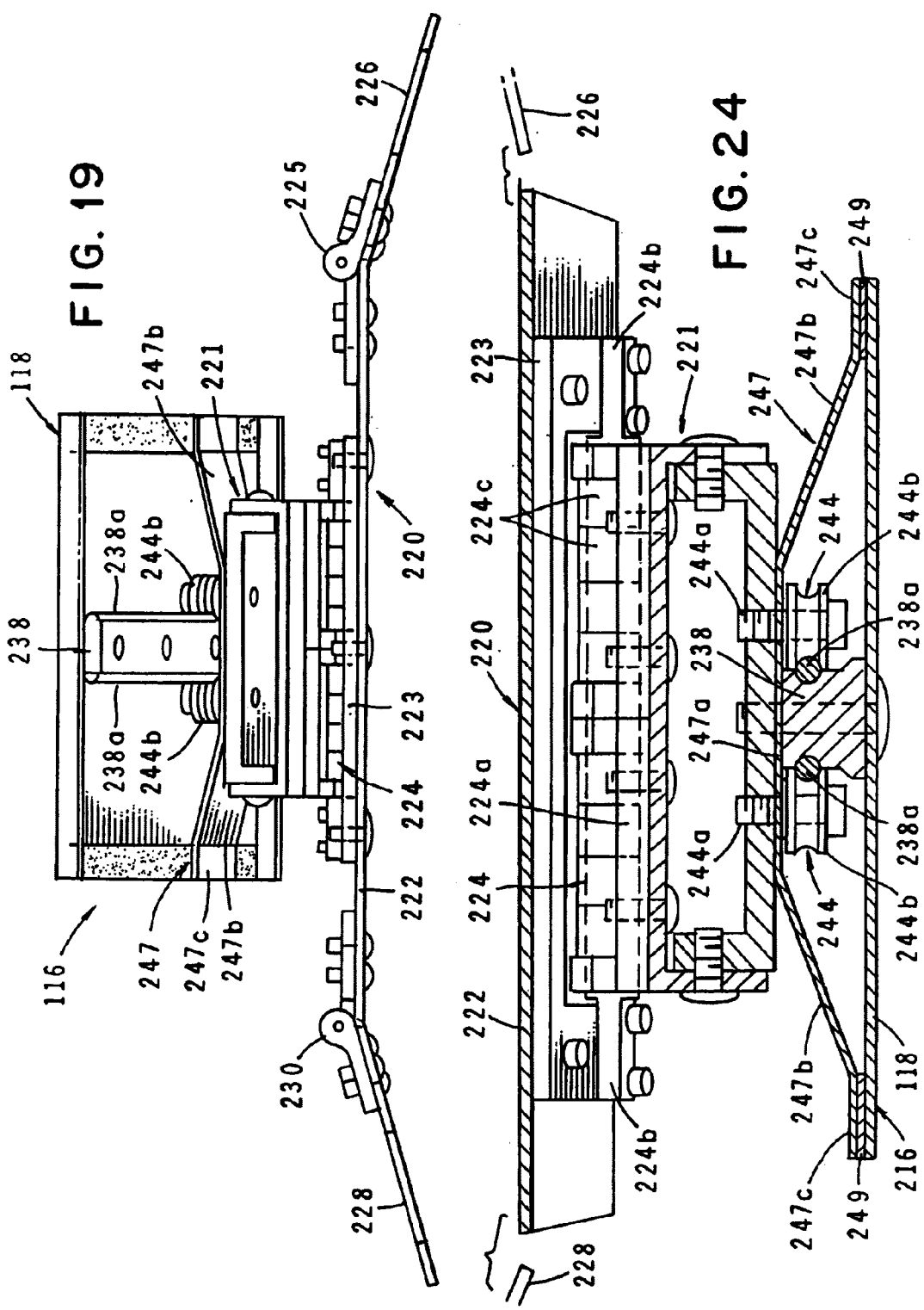
FIG. 19 is a cross-sectional view taken along lines 19—19 of FIG. 17.
Figure 26:
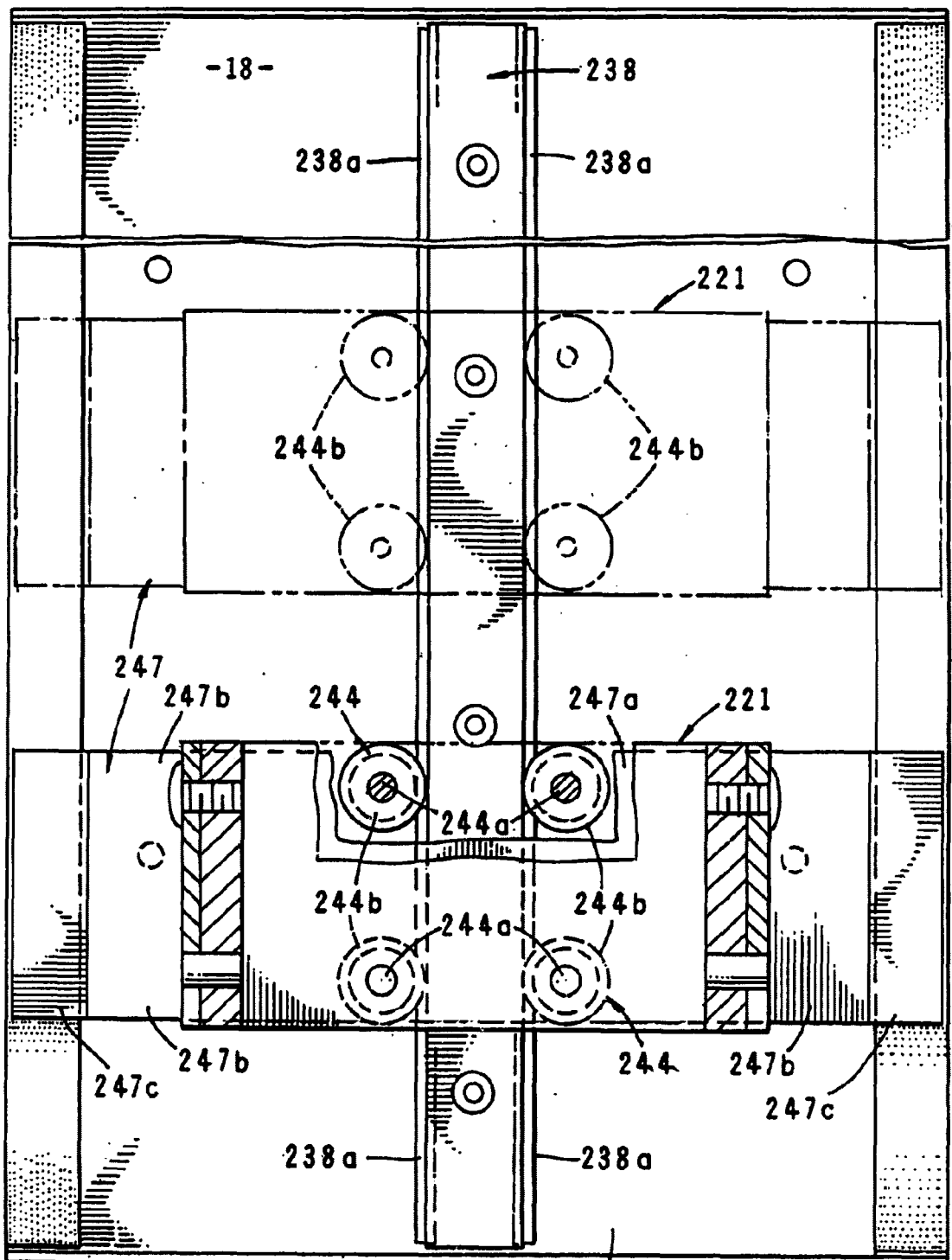
FIG. 26 is a cross-sectional view taken along lines 26—26 of FIG. 23.

As best seen in FIG. 24, head support assembly 220 includes a carriage assembly 221 to which a generally planar central support member or panel 222 is pivotally connected by means of a constant torque hinge 224 (FIG. 19). Connected to central support panel 222 by a constant torque hinge 225 is a first lateral or side panel 226, which is pivotally movable, a first position wherein it is substantially coplanar with central support panel 222 to a second angularly extending forward position. In similar fashion a second or lateral side panel 228 is connected to the opposite side of central support member 222 by a constant torque hinge 230 that is of identical construction to constant torque hinge 225. Side panel 228 is also pivotally movable from a substantially coplanar position with central support panel 222 to an angularly outwardly extending position. When side panel's 226 and 228 are pivoted into the angularly outwardly extending position, they provide a comfortable lateral support to the passenger's head "H" in the manner shown in FIG. 2. Constant torque hinges 225 and 230 are readily commercially available and function to maintain the side panels in a position desired by the user until a substantial force is exerted on the hingedly connected member to positively move it into a different position. As before, use of these constant torque hinges overcomes a common drawback of prior art headrest construction in which the hingedly connected members tend to undesirably move as a result of vibration or other environmental forces.

Figure 18:
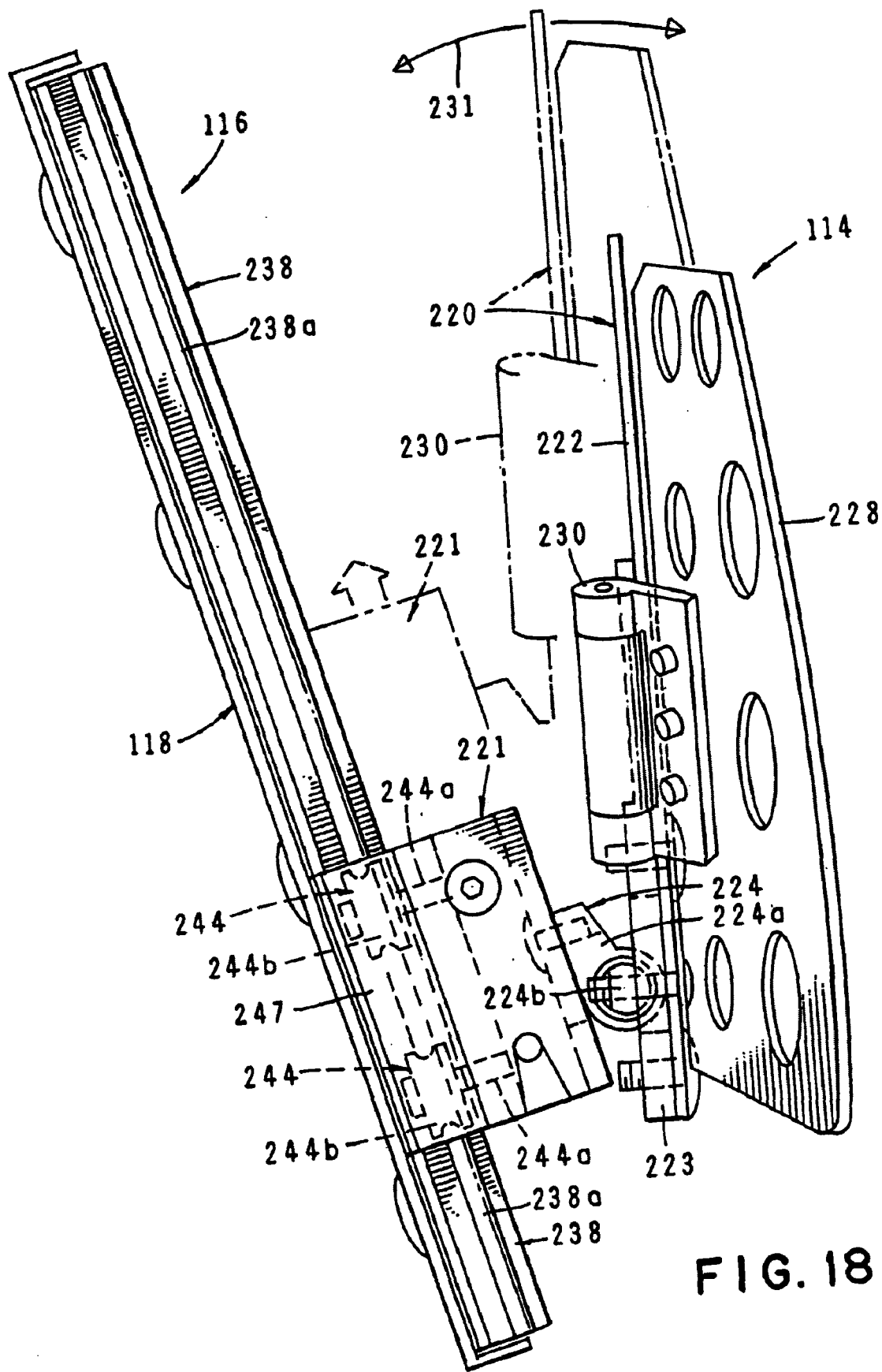
FIG. 18 is a view taken along lines 18—18 of FIG. 17.

As indicated by the arrow 231 in FIG. 18, constant torque hinge 224 permits the headrest assembly 220 to be adjustably pivoted both forwardly and rearwardly relative to the seat connector assembly 116. Constant torque hinge 224, which is readily commercially available from several commercial sources, including Torqmaster, International of Stamford, Conn., functions to maintain the headrest assembly 220 in a position desired by the user until a substantial force is exerted on the headrest assembly to positively move it into a different position. As shown in FIGS. 20 and 23, hinge 224 is mounted on a plate 233 and includes a housing 224a that carries a steel shaft 224b that, in turn, carries a plurality of spring steel friction bands 224c that function to controllably resist rotation of plate 223 and panel 222 that is attached thereto relative to connector assembly 116. Connected to seat connector member 118 is an elongated guide 238 that includes oppositely disposed guide rails 238a (FIG. 19) that are adapted to be rollably engaged by two pairs of spaced apart roller assemblies 244 that are mounted on carriage assembly 221. The roller assemblies 244, each of which are of identical construction, include a threaded connecting shaft 244a that is threadably connected to carriage assembly 221 and a grooved roller 244b that is rotatably mounted on shaft 244a. With this construction, carriage assembly 221 along with headrest assembly 220 can be adjustably moved upwardly and downwardly relative to seat connector member 118 so as to enable the desired adjustment in the height of the headrest assembly relative to the seat connector member.

Forming and important aspect of the headrest assembly of this latest form of the invention is resistance imparting means for imparting resistance to the movement of head rest assembly 220 upwardly and downwardly relative to connector member 118. In the present form of the invention, this novel resistance imparting means comprises a uniquely configured leaf spring designated in the drawings by the numeral 247. As best seen in FIGS. 22 and 24, spring 247 includes a central portion 247a that is affixed to carriage assembly 221 in the manner shown in the drawings. Spring member 247 also includes a pair of outwardly extending yieldably deformable side members 274b that are connected to central portion 247a. Each of the side members 247b terminates in a surface engaging portion 247c. As best seen in FIG. 24, when the resistance means is fully assembled portions 247c are substantially parallel to central portion 247a. With this construction, when carriage assembly 221 is interconnected with seat connector member 118 in the manner shown in FIG. 24, spring member 247 will be yieldably deformed in the manner shown in FIG. 24 so that surface engaging portions 247 are brought into pressural engagement with seat connector member 118. As the headrest assembly is moved upwardly and downwardly in the manner indicated in FIG. 26, surface engaging portions 247c will frictionally engage the outer surface of connector member 118 and will yieldably resist sliding movement of carriage assembly 221 relative to seat connector member 118. In the preferred form of the invention a plastic film 249 is disposed between surface engaging portions 247c and connector member 118 so as to insure smooth sliding of the headrest assembly relative to the connector member.

Figure 27:
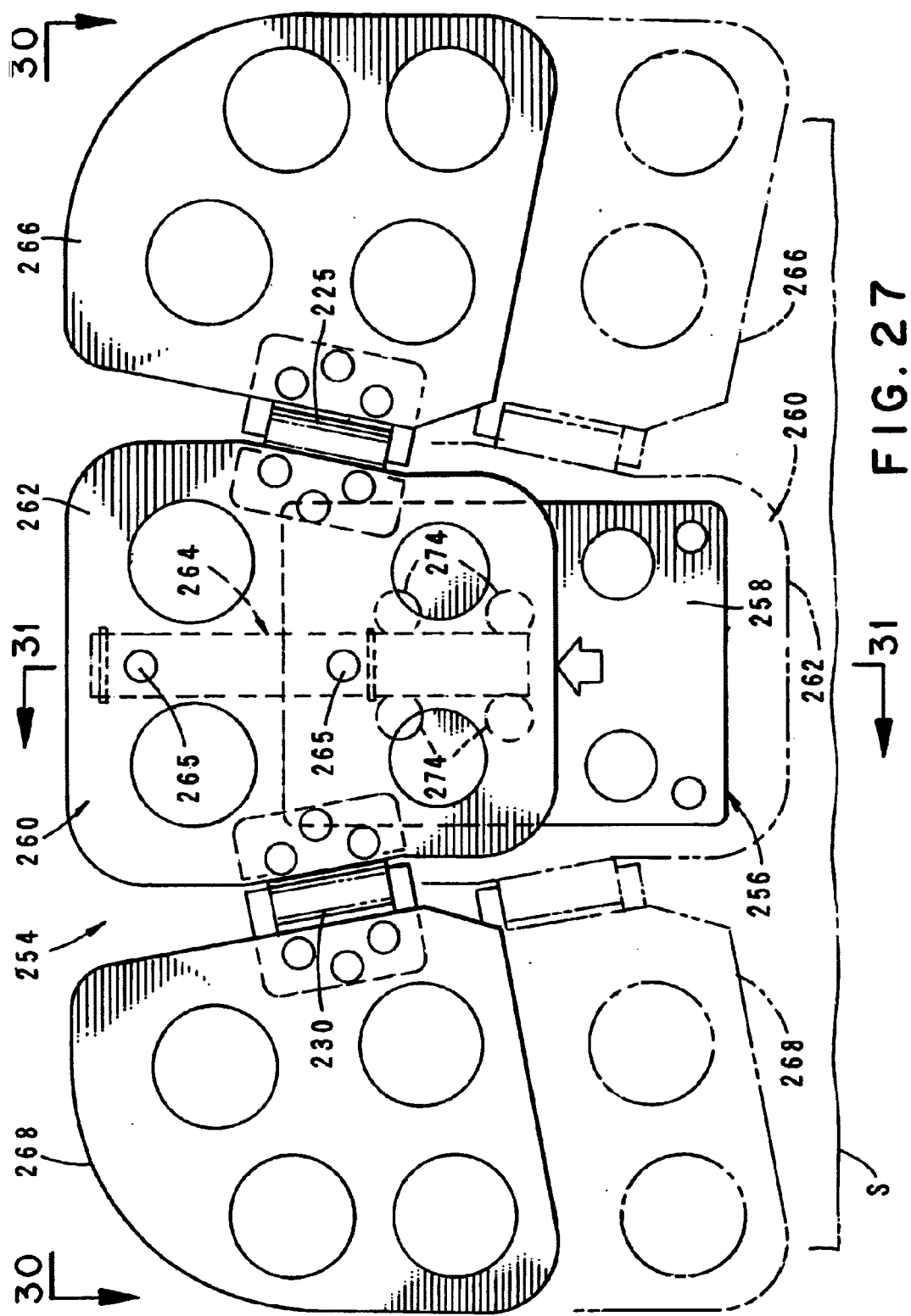
FIG. 27 is front view of an alternate form of the headrest assembly of the present invention.
Figure 28:
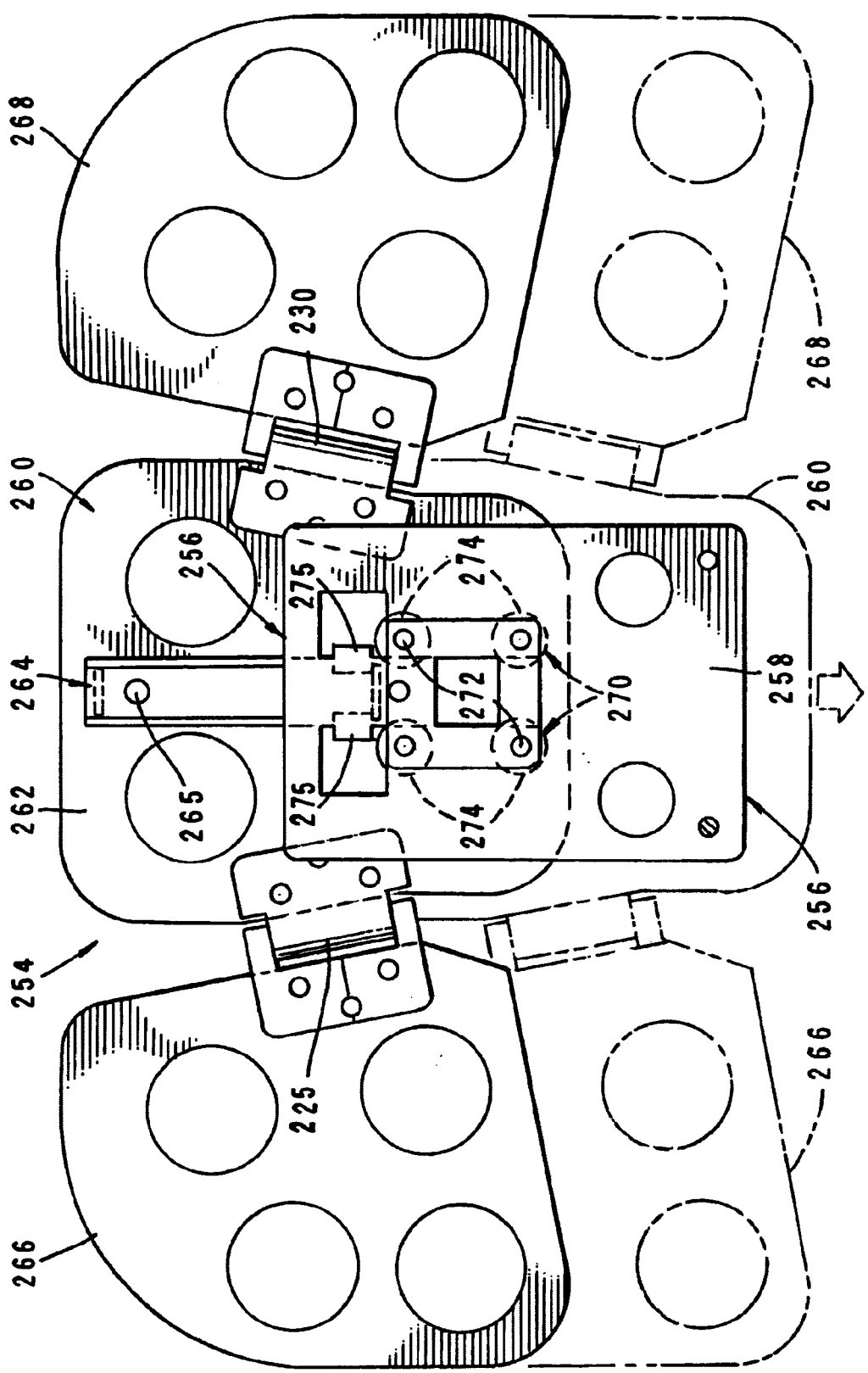
FIG. 28 is a rear view of the alternate form of the headrest assembly of the invention shown in FIG. 27.
Figure 29:
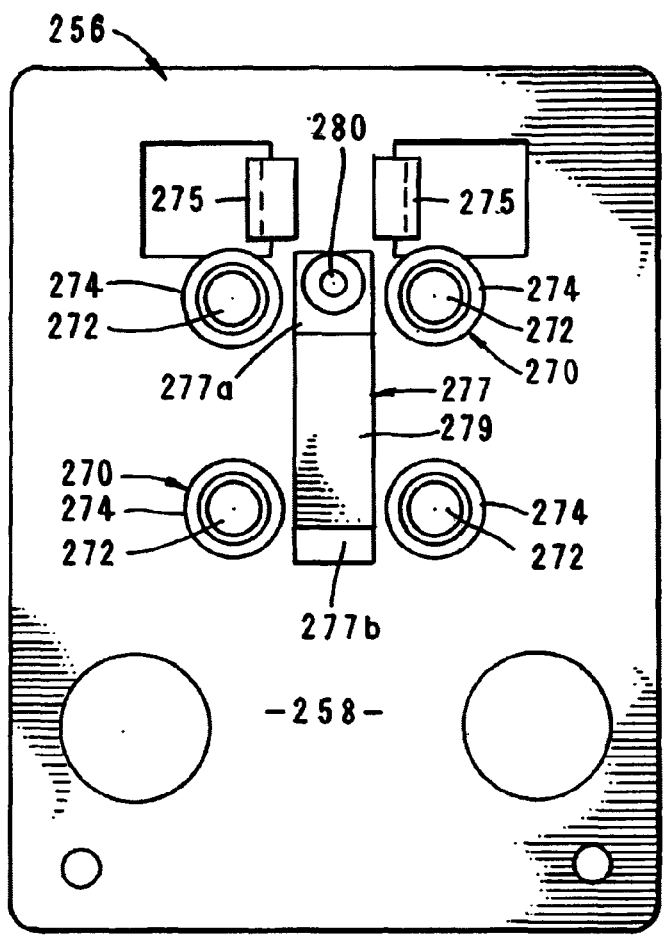
FIG. 29 is a plan view of the seat connector assembly of the apparatus that interconnects the headrest assembly with the aircraft seat.

Turning now to FIGS. 27 through 35, still another form of seat headrest of the invention is there illustrated and generally designated by the numeral 254. This latest embodiment of the invention is similar and several respects to the earlier described embodiments and like to numerals are used in FIGS. 27 through 36 to identify like components. This latest embodiment of the invention comprises a seat connector assembly 256 (FIG. 29) that includes a generally planar first connector member 258 that is connected to the seat "S" by any suitable means. Slidably connected to first connector member 258 for movement between a first lowered position shown by the phantom lines in FIGS. 27 and 28 and an upraised position shown by the solid lines in FIGS. 27 and 28 is a head support assembly 260 (see also FIG. 31).

Figure 31:
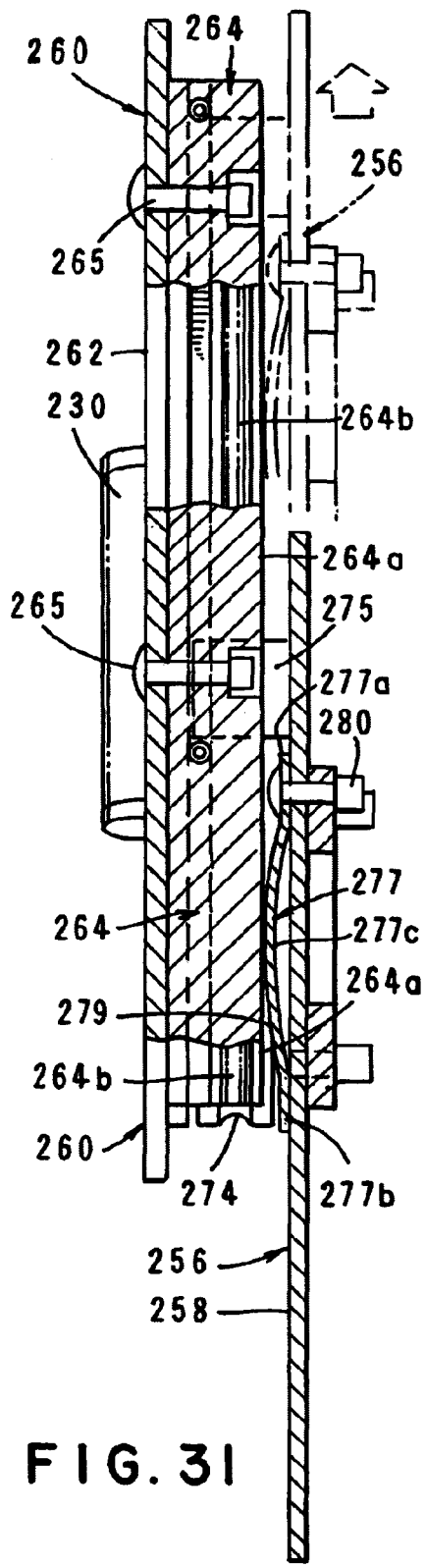
FIG. 31 is a cross-sectional view taken along lines 31—31 of FIG. 27.
Figure 33:
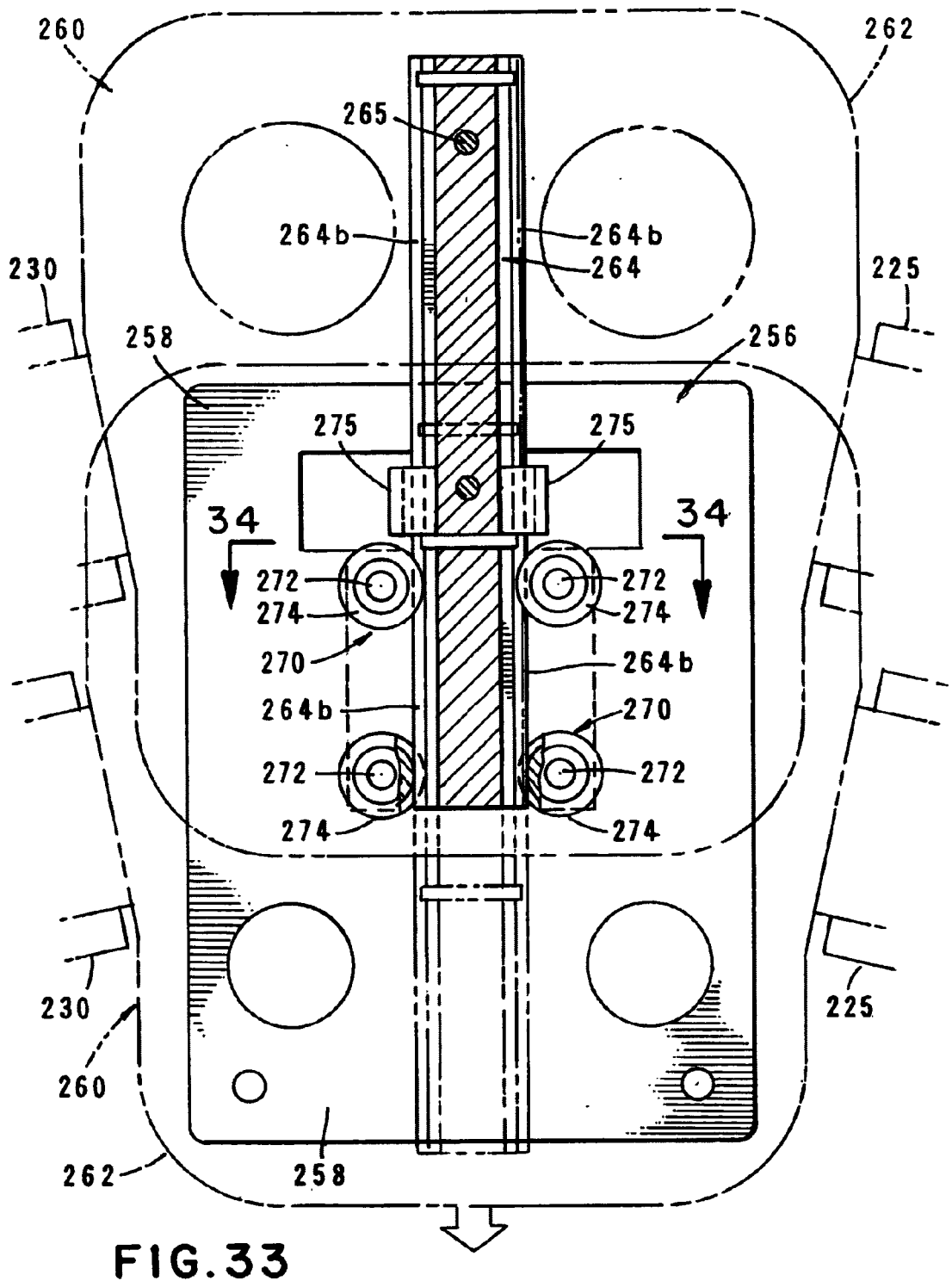
FIG. 33 is a cross-sectional view taken along lines 33—33 of FIG. 30.

As best seen in FIGS. 27, 28 and 30, head support assembly 260 includes a generally planar central support member or panel 262 to which an elongated guide member 264 is connected by means of connectors 265 (FIG. 31). A first lateral or side panel 266 is pivotally connected to the central support member by means of a constant torque hinge 225. Also connected to central support panel 262 by a constant torque hinge 230 is a second lateral or side panel 268. As indicated in FIG. 30, side panels 266 and 268 are pivotally movable, a first position shown by solid lines in FIG. 30 wherein they are substantially coplanar with central support panel 262 to a second angularly extending forward position shown by phantom lines in FIG. 30. When side panel's 266 and 268 are pivoted into the angularly outwardly extending position, they provide a comfortable lateral support to the passenger's head in the manner previously described and as shown in FIG. 2.

The earlier identified elongated guide member 264 includes oppositely disposed guide rails 264a (FIGS. 33, 34 and 35) that are adapted to be rollably engaged by two pairs of spaced apart roller assemblies 270 that are mounted on connector member 258. The roller assemblies 270, each of which are of identical construction, include a connecting shaft 272 that is connected to connector member 258 and a grooved roller 274 that is rotatably mounted on shaft 272 (FIG. 34). With this construction the headrest assembly 260 can be adjustably moved upwardly and downwardly relative to seat connector member 258 so as to enable the desired adjustment in the height of the headrest assembly relative to the seat connector member. As the headrest assembly is moved upwardly and downwardly, guide means, shown here as a pair of internal ears 275 formed on support member 258 (FIG. 30), slidably engage guide member 267 to guide the travel of the headrest assembly.

Figure 32:
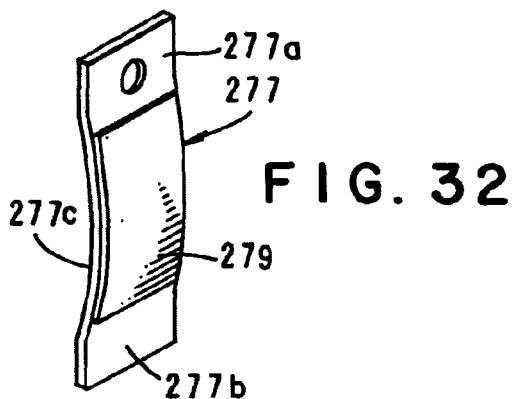
FIG. 32 is a generally perspective view of the resistance imparting means of this latest form of the invention.

Forming and important aspect of the headrest assembly of this latest form of the invention is resistance imparting means for imparting resistance to the movement of head rest assembly 260 upwardly and downwardly relative to connector member 258. In the present form of the invention, this novel resistance imparting means comprises a uniquely configured leaf spring designated in the drawings by the numeral 277. As best seen in FIGS. 31 and 32, spring 277 includes a first end portion 277a that is connected to support member 258 by a connector 280 (FIG. 31), a free end portion 277b and a yieldably deformable, outwardly curved central portion 277c. As indicated in FIG. 31, when the headrest assembly of the invention is fully assembled, central portion 277c of the spring is in pressural engagement with the front surface, or face, 264a of guide 264. More particularly, when the headrest assembly 260 is interconnected with seat connector member 258 in the manner shown in FIG. 31, spring member 277 will be yieldably deformed in the manner shown in FIG. 31 so that central portion 277c is brought into pressural engagement with face 264a of the elongated guide 264. With this construction, as the headrest assembly is moved upwardly and downwardly in the manner indicated in FIG. 28, spring 277 will yieldably resist sliding movement of headrest assembly 260 relative to elongated guide 264 and seat connector member 258. In the preferred form of the invention a plastic film 279 is disposed between the central portion 277c and the face 264a of elongated guide 264 so as to insure smooth sliding of the headrest assembly relative to the connector member.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A seat headrest for interconnection with a seat comprising:
   (a) a connector member connected to the seat;
   (b) a headrest assembly connected to said connector member for movement relative thereto between a first position and a second position;
   (c) an elongated guide connected to said headrest assembly;
   (d) a plurality of rollers connected to said connector member for rollable engagement with said elongated guide; and
   (e) resistance imparting means connected to said connector member for yieldably resisting movement of said headrest between said first position and said second position, said resistance imparting means comprising a spring disposed in compressive engagement with said elongated guide.

2. The seat headrest as defined in claim 1 in which said headrest assembly comprises a central support panel and a pair of side panels pivotally connected to said central panel.

3. The seat headrest as defined in claim 1 further including guide means connected to said headrest assembly for sliding engagement with said elongated guide to guide the travel of said headrest assembly between said first and second positions.

4. The seat headrest as defined in claim 3, in which said resistance imparting means comprises a spring element connected to said connector member proximate said rollers.

5. The seat headrest as defined in claim 1 in which said plurality of rollers comprise two spaced apart pairs of rollers connected to said connector member.

6. A seat headrest for interconnection with a seat comprising:
   (a) a connector member connected to the seat;
   (b) a plurality of rollers connected to said connector member;
   (c) a headrest assembly connected to said connector member for movement relative thereto between a first lowered position and a second upraised position, said headrest assembly comprising:
      (i) a central support panel;
      (ii) a guide connected to said central support panel, said plurality of rollers being in rollable engagement with said guide; and
      (iii) a pair of side panels pivotally connected to said central panel; and
   (d) resistance imparting means connected to said connector member and disposed in engagement with said guide for yieldably resisting movement of said headrest assembly between said first lowered position and said second upraised position, said resistance imparting means comprising a spring element in compressive engagement with said guide.

7. The seat headrest as defined in claim 6, further including a pair of inturned ears disposed in slidable engagement with said guide.

8. The seat headrest as defined in claim 6 in which said spring element includes a first end connected to said connector member, a second end and a curved central portion disposed in engagement with said guide.

9. The seat headrest as defined in claim 6 in which said side panels are connected to said central support panel by constant torque hinges.

10. A seat headrest for interconnection with a seat comprising:
    (a) a generally planar connector member connected to the seat;
    (b) a headrest assembly connected to said generally planar connector member;
    (c) a guide connected to a selected one of said connector member, and said headrest assembly;

(d) a plurality of rollers connected to a selected one of said generally planar connector member and said headrest assembly for rollable engagement with said guide; and (e) resistance imparting means connected to a selected one of said generally planar connector member and said headrest assembly for yieldably resisting movement of said headrest between said first lowered position and said second upraised position, said resistance imparting means comprising a resiliently deformable spring element.

11. The headrest as defined in claim 10 in which said headrest assembly comprises:

(a) a central support panel; and (b) a pair of side panels pivotally connected to said central panel by constant torque hinges.

12. The seat headrest as defined in claim 10 in which said spring element is connected to said generally planar member.

13. The seat headrest as defined in claim 12 in which said spring element has a first end connected to said generally planar connector member, a second end and an intermediate portion in pressural engagement with said guide.

* * * * *